United States Patent
Tong et al.

(10) Patent No.: US 11,030,487 B2
(45) Date of Patent: Jun. 8, 2021

(54) NOISE-ROBUST NEURAL NETWORKS AND METHODS THEREOF

(71) Applicant: Vanderbilt University, Nashville, TN (US)

(72) Inventors: Frank Tong, Nashville, TN (US); Hojin Jang, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 35 days.

(21) Appl. No.: 16/561,576

(22) Filed: Sep. 5, 2019

(65) Prior Publication Data

US 2020/0074234 A1   Mar. 5, 2020

Related U.S. Application Data

(60) Provisional application No. 62/727,181, filed on Sep. 5, 2018.

(51) Int. Cl.
  *G06K 9/62* (2006.01)
  *G06T 5/00* (2006.01)
  *G06T 7/00* (2017.01)

(52) U.S. Cl.
  CPC ......... *G06K 9/6257* (2013.01); *G06K 9/6203* (2013.01); *G06K 9/6269* (2013.01); *G06T 5/002* (2013.01); *G06T 7/0016* (2013.01); *G06T 2207/10004* (2013.01); *G06T 2207/20081* (2013.01); *G06T 2207/20084* (2013.01); *G06T 2207/20182* (2013.01)

(58) Field of Classification Search
  None
  See application file for complete search history.

(56) References Cited

U.S. PATENT DOCUMENTS 10,298,895 B1 *  5/2019  Ramachandra ........... H04N 9/43
10,402,682 B1 *  9/2019  Kirchner .............. G06K 9/4671
(Continued)

OTHER PUBLICATIONS

You, Zhonghui, et al. "Adversarial noise layer: Regularize neural network by adding noise." 2019 IEEE International Conference on Image Processing (ICIP). IEEE, 2019. (Year: 2019).*

(Continued)

*Primary Examiner* — Andrae S Allison
(74) *Attorney, Agent, or Firm* — Meunier Carlin & Curfman LLC

(57) ABSTRACT

The exemplified methods and systems facilitate the training of a noise-robust deep learning network that is sufficiently robust in the recognition of objects in images having extremely noisy elements such that the noise-robust network can match, or exceed, the performance of human counterparts. The extremely noisy elements may correspond to extremely noisy viewing conditions, e.g., that often manifests themselves in the real-world as poor weather or environment conditions, sub-optimal lighting conditions, sub-optimal image acquisition or capture, etc. The noise-robust deep learning network is trained both (i) with noisy training images with low signal-to-combined-signal-and-noise ratio (SSNR) and (ii) either with noiseless, or generally noiseless, training images or a second set of noisy training images having a SSNR value greater than that of the low-SSNR noisy training images.

28 Claims, 17 Drawing Sheets

(11 of 17 Drawing Sheet(s) Filed in Color)

(56) References Cited

U.S. PATENT DOCUMENTS

| | | | | |
|---|---|---|---|---|
| 10,445,608 | B2* | 10/2019 | Kim | G06K 9/24 |
| 10,489,637 | B2* | 11/2019 | Hu | G06K 9/00248 |
| 10,521,873 | B2* | 12/2019 | Aller | H04N 1/32203 |
| 10,635,943 | B1* | 4/2020 | Lebel | G06N 3/084 |
| 2019/0197549 | A1* | 6/2019 | Sharma | G06N 3/04 |
| 2019/0197550 | A1* | 6/2019 | Sharma | G06N 3/08 |
| 2021/0004941 | A1* | 1/2021 | Hanwell | G06T 7/12 |

OTHER PUBLICATIONS

Lehtinen, Jaakko, et al. "Noise2noise: Learning image restoration without clean data." arXiv preprint arXiv: 1803.04189 (2018). (Year: 208).*

An, G., "The effects of adding noise during backpropagation training on a generalization performance," Neural computation 8, 643-674 (1996).

Biederman, I., "Recognition-by-components: a theory of human image understanding," Psychol Rev 94, 115-147 (1987).

Biederman, I., and Gerhardstein, P.C., "Recognizing depth-rotated objects: evidence and conditions for three-dimensional viewpoint invariance," J Exp Psychol Hum Percept Perform 19, 1162-1182 (1993).

Bishop, C.M. , "Training with noise is equivalent to Tikhonov regularization," Neural Comput. 7, 108-116 (1995).

Bülthoff, H.H., Edelman, S.Y., and Tarr, M.J., "How are three-dimensional objects represented in the brain?", Cerebral Cortex 5, 247-260 (1995).

Chatfield, K., Simonyan, K., Vedaldi, A., and Zisserman, A., "Return of the devil in the details: Delving deep into convolutional nets", arXiv preprint arXiv:1405.3531 (2014).

DiCarlo, J.J., Zoccolan, D., and Rust, N. C., "How does the brain solve visual object recognition?", Neuron 73, 415-434 (2012).

Dodge, S., and Karam, L., "Understanding how image quality affects deep neural networks", In Quality of Multimedia Experience (QoMEX), 2016 Eighth International Conference on. (IEEE), pp. 1-6 (2016).

Dodge, Samuel, and Lina Karam. "A study and comparison of human and deep learning recognition performance under visual distortions", 2017 26th international conference on computer communication and networks (ICCCN). IEEE, 2017.

Field, D.J., "Relations between the statistics of natural images and the response properties of cortical cells", J Opt Soc Am A 4, 2379-2394 (1987).

Fukushima, K., "Neocognitron: A self-organizing neural network model for a mechanism of pattern recognition unaffected by shift in position", Biological Cybernetics 36, 193-202 (1980).

Geirhos, et al., "Generalisation in humans and deep neural networks", 32nd Conference on Neural Information Processing Systems (NeurIPS 2018), Montreal, Canada, 13 pages (2018).

Goodfellow, Ian J., Jonathon Shlens, and Christian Szegedy ,"Explaining and harnessing adversarial examples" arXiv preprint arXiv:1412.6572 (2014).

Hagmann, C.E., and Potter, M.C., "Ultrafast scene detection and recognition with limited visual information," Vis cogn 24, 2-14 (2016).

He, K., Zhang, X., Ren, S., and Sun, J., "Delving deep into rectifiers: Surpassing human-level performance on imagenet classification", In IEEE International Conference on Computer Vision. (Santiago, Chile) (2015).

Hubel, D.H., and Wiesel, T.N., "Receptive fields, binocular interaction and functional architecture in the cat's visual cortex", Journal of Physiology 160, 106-154 (1962).

Krizhevsky, A., Sutskever, I., and Hinton, G.E., "ImageNet classification with deep convolutional neural networks", In Advances in Neural Information Processing Systems. pp. 1-9 (2012).

LeCun, Y., Bengio, Y., and Hinton, G., "Deep learning", Nature 521, 436-444 (2015).

LeCun, Y., Boser, B.E., Denker, J.S., Henderson, D., Howard, R.E., Hubbard, W.E., and Jackel, L.D., "Handwritten digit recognition with a back-propagation network", In Advances in neural information processing systems, pp. 396-404.

Mervis, C.B., and Rosch, E., "Categorization of natural objects", Annual Review of Psychology 32, 89-115 (1981).

Palmeri, T.J., and Gauthier, I., "Visual object understanding", Nat Rev Neurosci 5, 291-303 (2004).

Potter, M.C., "Meaning in visual search", Science 187, 965-966 (1975).

Riesenhuber, M., and Poggio, T., "Hierarchical models of object recognition in cortex", Nat Neurosci 2, 1019-1025 (1999).

Rifai, S., Glorot, X., Bengio, Y., and Vincent, P., "Adding noise to the input of a model trained with a regularized objective", arXiv preprint arXiv:1104.3250 (2011).

Rodner, Erik, et al., "Fine-grained recognition in the noisy wild: Sensitivity analysis of convolutional neural networks approaches", arXiv preprint arXiv:1610.06756 (2016).

Russakovsky et al., "ImageNet Large Scale Visual Recognition Challenge", International Journal of Computer Vision (IJCV), 115:3, pp. 211-252 (2015).

Sietsma, J., and Dow, R.J., "Creating artificial neural networks that generalize", Neural networks 4, 67-79 (1991).

Simonyan, K., and Zisserman, A., "Very deep convolutional networks for large-scale image recognition", arXiv preprint arXiv:1409.1556 (2014).

Srivastava, N., Hinton, G., Krizhevsky, A., Sutskever, I., and Salakhutdinov, R., "Dropout: A simple way to prevent neural networks from overfitting", The Journal of Machine Learning Research 15, 1929-1958 (2014).

Szegedy, C., Liu, W., Jia, Y., Sermanet, P., Reed, S., Anguelov, D., Erhan, D., Vanhoucke, V., and Rabinovich, A., "Going deeper with convolutions", In Proceedings of the IEEE Conference on Computer Vision and Pattern Recognition. pp. 1-9 (2015).

Szegedy, C., Vanhoucke, V., Ioffe, S., Schlens, J., and Wojna, Z., "Rethinking the inception architecture for computer vision", In Proceedings of the IEEE Conference on Computer Vision and Pattern Recognition. (Las Vegas, NV, USA) (2016).

Szegedy, Christian, et al., "Intriguing properties of neural networks", arXiv preprint arXiv:1312.6199 (2013).

Uličný, Matej, Jens Lundstrom, and Stefan Byttner,."Robustness of deep convolutional neural networks for image recognition", International Symposium on Intelligent Computing Systems. Mexico, Mar. 16-18, 2016.

Vedaldi, A., and Lenc, K., "Matconvnet: Convolutional neural networks for matlab", In Proceedings of the 23rd ACM international conference on Multimedia. (ACM), pp. 689-692 (2015).

Yamins, D.L., Hong, H., Cadieu, C.F., Solomon, E.A., Seibert, D., and DiCarlo, J.J., "Performance-optimized hierarchical models predict neural responses in higher visual cortex," Proc Natl Acad Sci U S A 111, 8619-8624 (2014).

Zur, R.M., Jiang, Y., Pesce, L.L., and Drukker, K., "Noise injection for training artificial neural networks: A comparison with weight decay and early stopping", Medical physics 36, 4810-4818 (2009).

* cited by examiner

FIG. 12A AlexNet

FIG. 12B VGG-16

FIG. 12C GoogLeNet

NOISE-ROBUST NEURAL NETWORKS AND METHODS THEREOF

RELATED APPLICATION

This application claims priority to, and the benefit of, U.S. Provisional Patent Application No. 62/727,181, filed Sep. 5, 2018, which is incorporated by reference herein in its entirety.

TECHNICAL BACKGROUND

The disclosure relates generally to a system and method to configure a neural network, in particular, a neural network that is robust in the recognition of objects in images having extremely noisy elements, and the use of such neural network in an application (e.g., real-world application).

BACKGROUND

Recent advances in deep learning have led to the development of deep neural networks (DNNs) that can achieve excellent performance at object classification and object localization tasks. Based on recent observed performance of these networks at performing such tasks, including the well-known ImageNet Large Scale Visual Recognition Challenge, several research groups have claimed that deep learning networks have attained human-level performance at object recognition, based on the accuracy with which they can correctly classify optimally acquired real-world photos of objects in their natural environment.

Although deep neural networks such as convolutional neural networks (CNNs) have demonstrated outstanding levels of performance at object recognition tasks, DNNs/CNNs still lack robustness for many real-world applications.

SUMMARY

The exemplified methods and systems facilitate the training of a noise-robust deep learning network that is sufficiently robust in the recognition of objects in images having extremely noisy elements that match, or exceed, that of human counterparts. The extremely noisy elements may correspond to extremely noisy viewing conditions, e.g., that often manifest themselves in the real world as poor weather or environment conditions, sub-optimal lighting conditions, sub-optimal image acquisition or capture, etc.

The noise-robust deep learning network is trained both (i) with noisy training images with low signal-to-combined-signal-and-noise ratio (SSNR) and (ii) with noiseless, generally noiseless, or training images having a SSNR value greater than the noisy low SSNR. Such dual SSNR training was observed, and validated, to improve the robustness of a deep learning network which then becomes noise-robust at recognizing objects in subsequent images in highly noisy conditions or degraded visual images (as well as across a range of noisy conditions). To generate noisy training images with low SSNRs, the system, in some embodiments, attenuates or reduces the range (e.g., effective range or dynamic range) of an original noise-free or generally noise-free image and then combines the attenuated source image with a noise image or noise elements that have an appropriate dynamic range. The reduction in range (e.g., dynamic range or effective range) of the source image, prior to the introduction of the noise image or noise elements, reduces the signal portion or signal strength of the image and serves to push the SSNR level of the training images to lower SSNR levels not previously used in the training of deep neural networks. The methodology may be applied to newly formulated CNN/DNN or to pre-trained CNN/DNN to improve, or provide, robust recognition of objects in images having extremely noisy elements.

In an aspect, a method is disclosed of training a neural network (e.g., deep convolutional neural networks) to attain robustness, in recognizing objects in extremely noise images, with performance comparable to, or exceeding that of, a person with normal healthy vision. The method includes obtaining, by one or more processors, a plurality of source training images (e.g., compressed or uncompressed images) from one or more databases of images (e.g., ImageNet) (e.g., wherein a portion of the plurality of source training images are generally noise-free); and generating, by the one or more processors, a set of one or more noisy training images, including a first noisy training image (e.g., having a SSNR value below, or around, the boundary of normal human perception) based on each of the plurality of source training images.

The generated set of one or more noisy images in combination with noiseless images or generally noiseless images (e.g., of the one or more databases of images) are used as training images to train the neural network. The term "noiseless" and "noise-free" are interchangeably used herein. In some embodiments, the generated set of one or more noisy images are used in training of the neural network in combination with a second set of noisy images (e.g., having a second SSNR greater than a first SSNR associated with the generated set of one or more noisy images).

The step of generating the noisy training images, in some embodiments, includes (i) adjusting values of a substantial portion of the pixels of the given source training image to reduce the range (e.g., the contrast or effective range) of the given source training image (e.g., to a pre-defined signal strength, to a pre-defined variance, or by a pre-defined amount); and (ii) adjusting, to introduce noise (e.g., achromatic noise), values of pixels of the range-adjusted source training image (e.g., dynamic-range-adjusted source training images) to generate the low-SSNR training image (e.g., using an additive/subtractive operative, a multiplicative operation, a compression operation).

Indeed, it is observed that CNNs and other DNNs trained with such combination of noisy images and of noiseless images or generally noiseless images (or a second set of noisy images having a different SSNR value) can attain robustness that matches, or exceeds, that of a normal person at recognizing and identifying image content contaminated with a wide range of noise levels and noisy environments.

In some embodiments, the method includes storing the set of the noisy images (e.g., along with the source images) to a database from which the images can be retrieved for eventual training and/or testing of the neural network.

In some embodiments, effective ranges over which pixel intensity values in the noisy training images vary due to the introduced noise is as large as, or larger than, ranges over which pixel intensity values vary due to information originating from the source training images. In some embodiments, the variance of the pixel intensity values arising from the introduced noise exceeds the variance of the pixel intensity values that arise from the source training images.

In some embodiments, the step of adjusting the pixel values of the range-adjusted source training image (e.g., dynamic-range-adjusted source training image) to generate the noisy training image includes combining generated noise values with values of a substantial portion of the pixels of the range-adjusted source training image to generate a combined-noise image; and re-centering the dynamic range of the combined-noise image (e.g., between values 0-255 for 8-bit pixel values, and etc.).

In some embodiments, the method further includes generating, by the one or more processors, a second noisy training image of the set of one or more noisy training images, wherein the first noisy training image has a first associated SSNR value and the second noisy training image has a second associated SSNR value, wherein the first associated SSNR value and the second associated SSNR value are different, and wherein the first noisy training image and the second noisy training image are used in combination with noiseless images or generally noiseless images as training images to train the neural network.

In some embodiments, the source training image is constructed from a weighted combination of a source image and a noise image.

In some embodiments, the introduced noise comprises a combination of both spatially uncorrelated noise and spatially correlated noise.

In some embodiments, the introduced noise is applied in a spatially non-uniform manner across the source training images.

In some embodiments, the introduced noise comprises spatially uncorrelated pixel noise. In some embodiments, the values of each pixel in the noise image are determined pseudo-randomly or randomly and independently of all other pixels in the noise image. In some embodiments, the distribution of pixel intensity values for the generated noise image is selected from the group consisting of a Gaussian distribution, a log-Gaussian distribution, a uniform distribution, an "inverted-U" shaped distribution, an approximately flat/uniform distribution, and a combination thereof. In some embodiments, the spatially uncorrelated pixel noise is determined from a mathematically defined or numerically-defined distribution including "inverted-U" shaped distribution or an approximately flat/uniform distribution based on its utility or similarity to a Gaussian distribution, a log-Gaussian distribution, or a uniform distribution, including inverted-V shaped distribution as well as other asymmetric (e.g., skewed) and non-symmetric distributions.

In some embodiments, the introduced noise consists substantially of Gaussian pixel noise.

In some embodiments, the introduced noise comprises spatially correlated noise that follow a $1/F^{\alpha}$ power spectrum in the Fourier domain (e.g., where F refers to spatial frequency and $\alpha$ has a range between 1.0 and 3.0).

In some embodiments, the introduced noise comprises a plurality of image elements having a semi-opaque component and/or an opaque component (e.g., having an appearance of snow fall, rain fall, hail, etc.) (e.g., wherein the semi-opaque component and the opaque component are generated by an attenuation operation, a reflectance operation, a masking or element replacement operation, a local blurring operation, and/or a combination thereof).

In some embodiments, the introduced noise is introduced to a channel selected from the group consisting of a chrominance channel of the range adjusted source training image (e.g., dynamic-range adjusted source training images), in which different noise images are introduced to the red, green, and blue channels, and a luminance channel of the dynamic-range adjusted source training image, in which the same noise image is introduced to the red, green and blue channels.

In some embodiments, the method further includes converting, by the one or more processors, the plurality of source training images to greyscale (e.g., wherein the set of one or more noisy training images are generated from the converted plurality of greyscale source training images), wherein the introduced noise is used to adjust scalar values of the plurality of converted greyscale source training images.

In some embodiments, the plurality of source training images, or a portion thereof, comprise one or more captured frames of a recorded video, including a first captured frame and a second captured frame, wherein the introduced noise of the first captured frame includes a component of spatiotemporal-correlated noise associated with the introduced noise of the second captured frame (e.g., Fourier phase-scrambled noise, or pixelated noise).

In some embodiments, the plurality of source training images, or a portion thereof, comprise one or more captured frames of a recorded video, including a first captured frame and a second captured frame, wherein the introduced noise of the first captured frame is spatially uncorrelated with the introduced noise of the second captured frame.

In some embodiments, a database of the one or more databases of images comprises a plurality of sets of images, wherein each set of the sets of images is associated with an image category.

In some embodiments, each noisy training image of the set of one or more noisy training images comprises an associated SSNR value, and wherein the associated SSNR values for a portion of the set of noisy training images are sampled (randomly, pseudo-randomly, or deterministically) from a range (e.g., continuous range) of SSNR values or from a set of discrete SSNR values.

In another aspect, the method (e.g., of training the neural network) further includes applying, by the one or more processors, the set of generated one or more noisy images is used in combination with a set of generally noiseless images as training images (or a second set of noisy training images having a high/higher SSNR value than that of the set of generated one or more noisy images) to the training of the neural network.

In some embodiments, the neural network is selected from the group consisting of an autoencoder, a probabilistic neural network, a time delay neural network, and a convolutional neural network, deep neural network, deep convolutional network, deconvolutional network, feed-forward based neural network, recurrent based neural network, general adversarial network, variational auto encoder, Kohonen network, Support Vector Machine, and Markov chain-based networks.

In another aspect, the trained neural network is used in a control application, a diagnostic application, or computer vision application (e.g., autonomous vehicle, surveillance, security, robotics, factory automation, process automation, medical diagnostic application).

In some embodiments, the method further includes using a trained neural network in a control, diagnostic, or computer vision application, wherein the neural network was trained using training images generated according to any of the above-discussed method steps.

In some embodiments, the trained neural network is used to generate and apply labels for image categories to a set of images.

In some embodiments, the trained neural network is used to categorize and localize multiple different types of objects contained in a set of images.

In another aspect, non-transitory computer readable medium is disclosed having instructions stored thereon, wherein the instructions include instruction for a neural network that has been trained with a combination of noisy training images and of noiseless or generally noiseless images (e.g., to achieve robustness), wherein the noisy training images are generated according to any of the above-discussed method steps.

In another aspect, a system is disclosed. The system includes one or more processors; and a memory having instructions stored thereon, wherein execution of the instructions by the one or more processors causes the one or more processors to perform any of the above-discussed method steps.

In another aspect, a non-transitory computer readable medium is disclosed having instructions stored thereon, wherein execution of the instructions by one or more processors causes the one or more processors to perform any of the above-discussed method steps.

BRIEF DESCRIPTION OF DRAWINGS

The patent or application file contains at least one drawing executed in color. Copies of this patent or patent application publication with color drawing(s) will be provided by the Office upon request and payment of the necessary fee.

Indeed, this application is directed to the configuring of a neural network, in particular, a neural network that is robust in the recognition of objects in images having extremely noisy elements, and the use of such neural network in an application. Certain applications and configuration input may be in color, and figures as presented in color may be necessary for the understanding of the claims.

Figure 1:
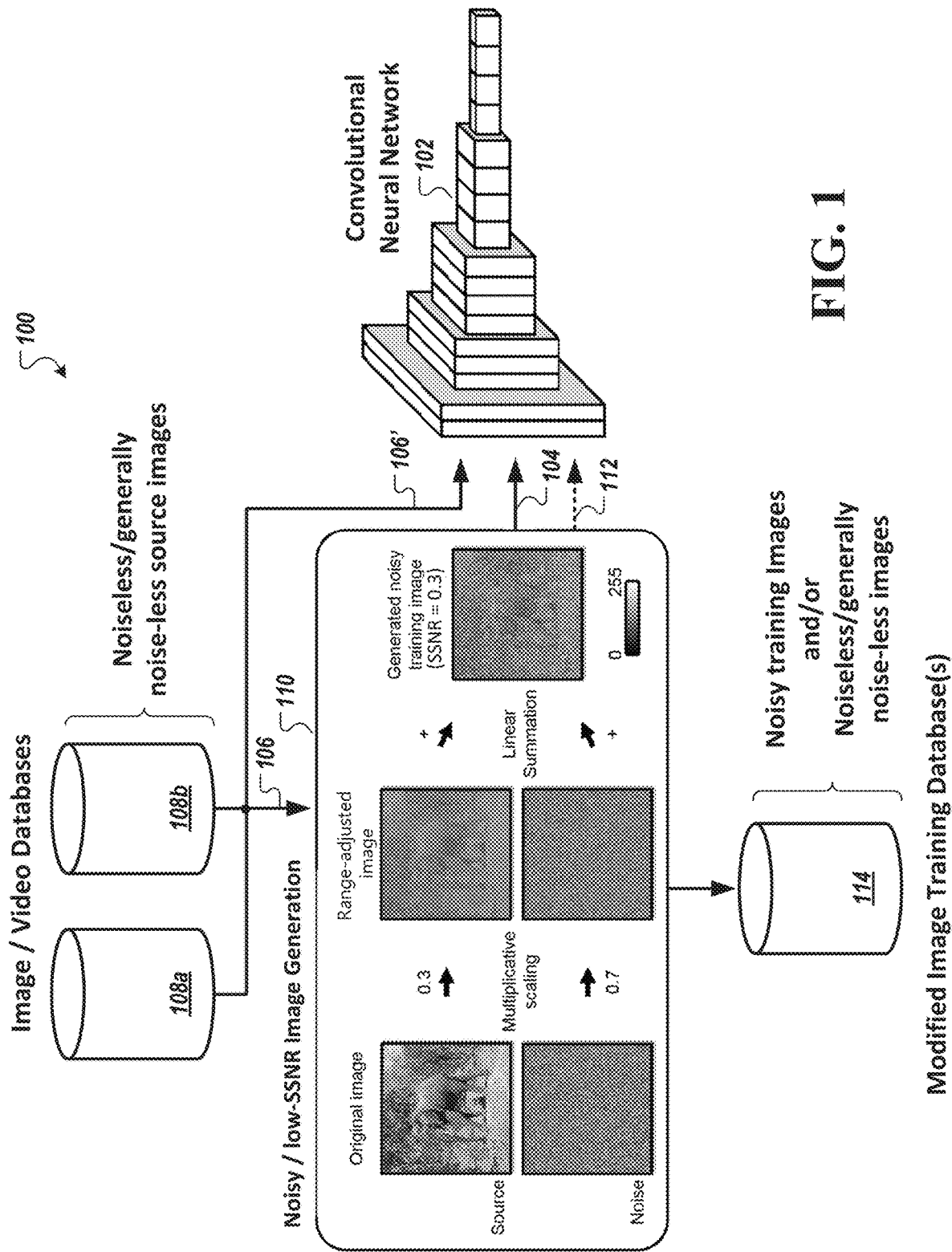

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIG. 1 is a diagram of a system configured to train a neural network with noisy images (e.g., low SSNR images) in combination with either noiseless images/generally noiseless images or a second set of noisy images (e.g., having an associated SSNR value greater than that of the low SSNR training images) to generate a noise-robust neural network, in accordance with an illustrative embodiment.

Figure 2:
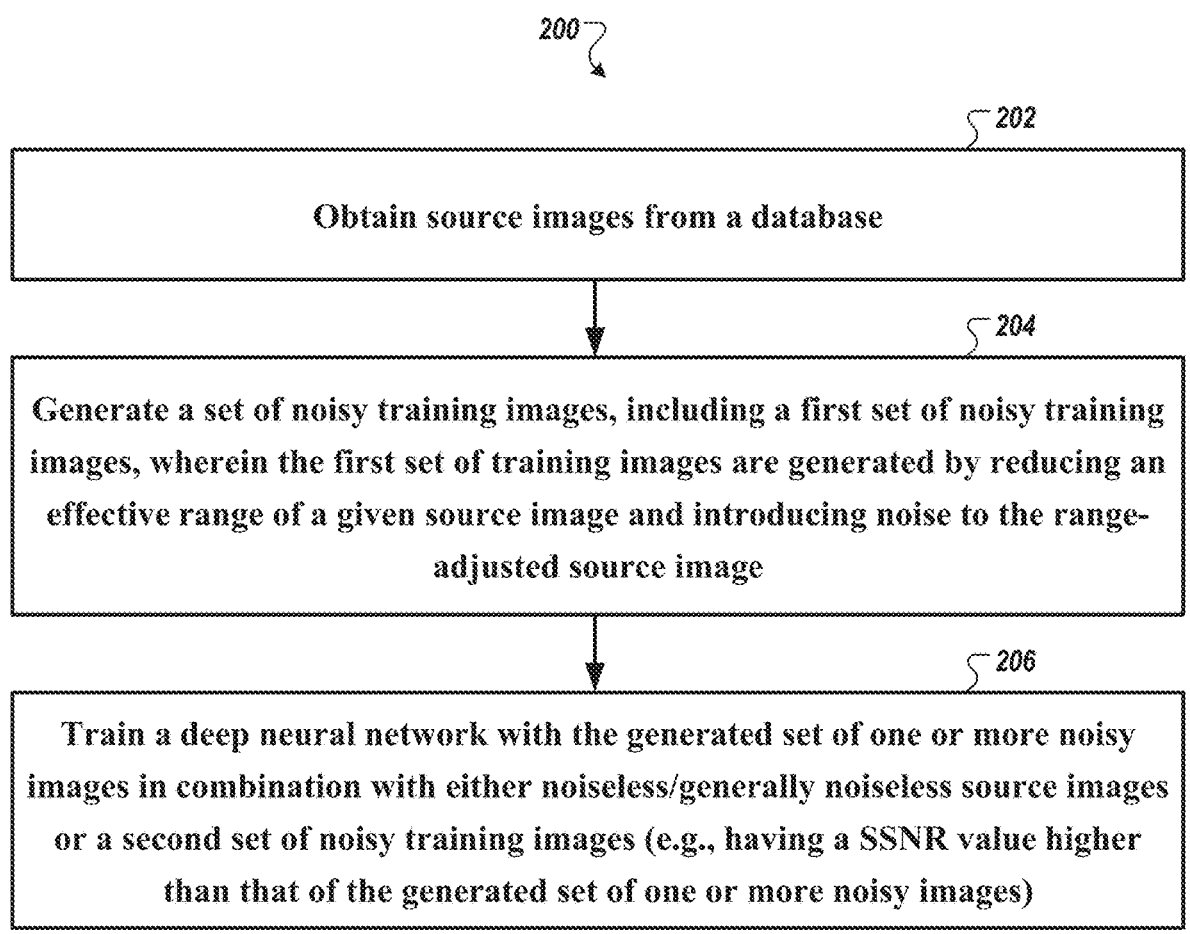

FIG. 2 is a flow diagram showing a training process performed by the system of FIG. 1, in accordance with an illustrative embodiment.

Figure 3:
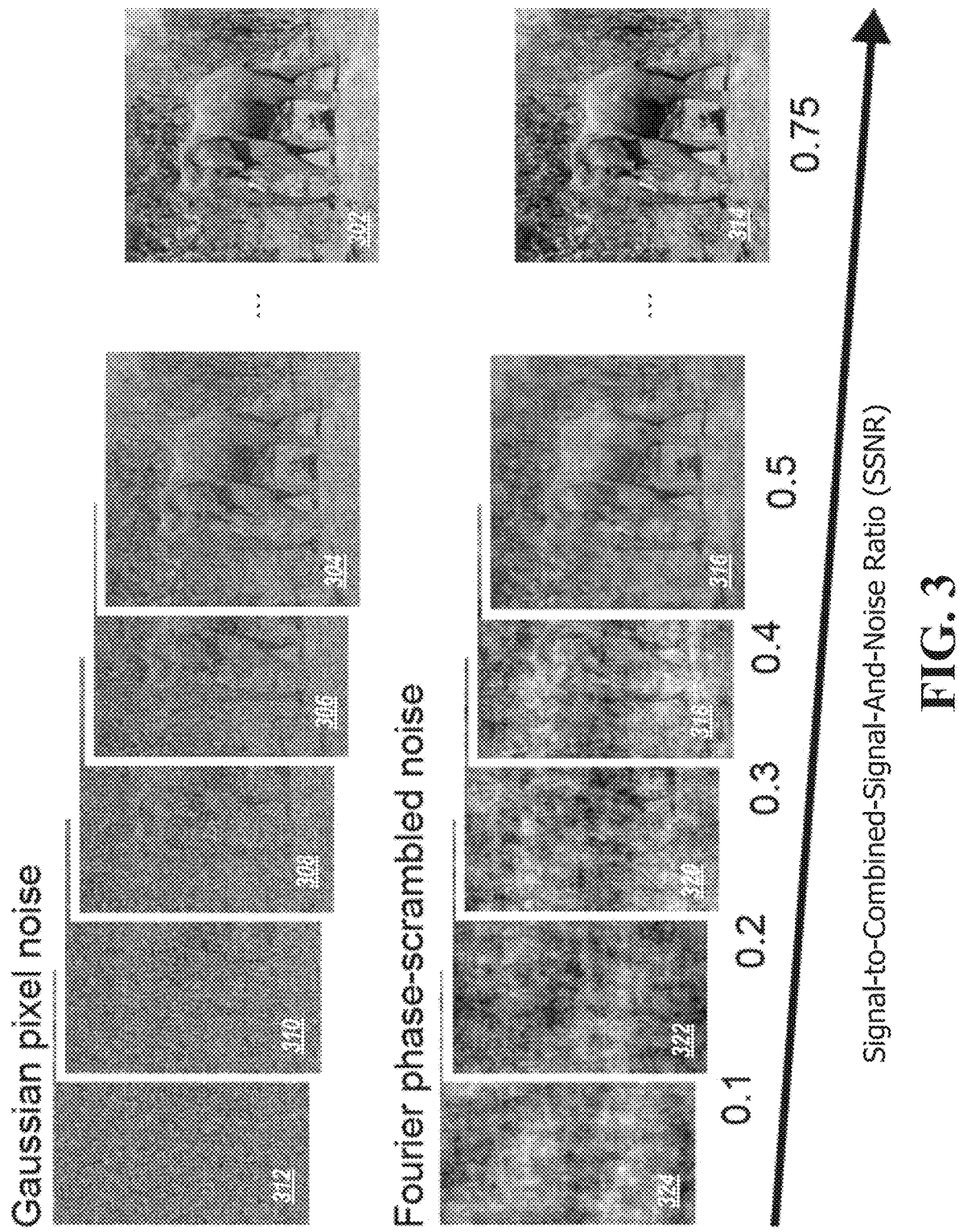

FIG. 3 is a diagram showing examples of noisy images generated at varying levels of SSNR in which the introduced noise is spatially uncorrelated (e.g., Gaussian pixel noise) or spatially correlated (e.g., Fourier phase-scrambled noise), in accordance with an illustrative embodiment.

Figure 4A:
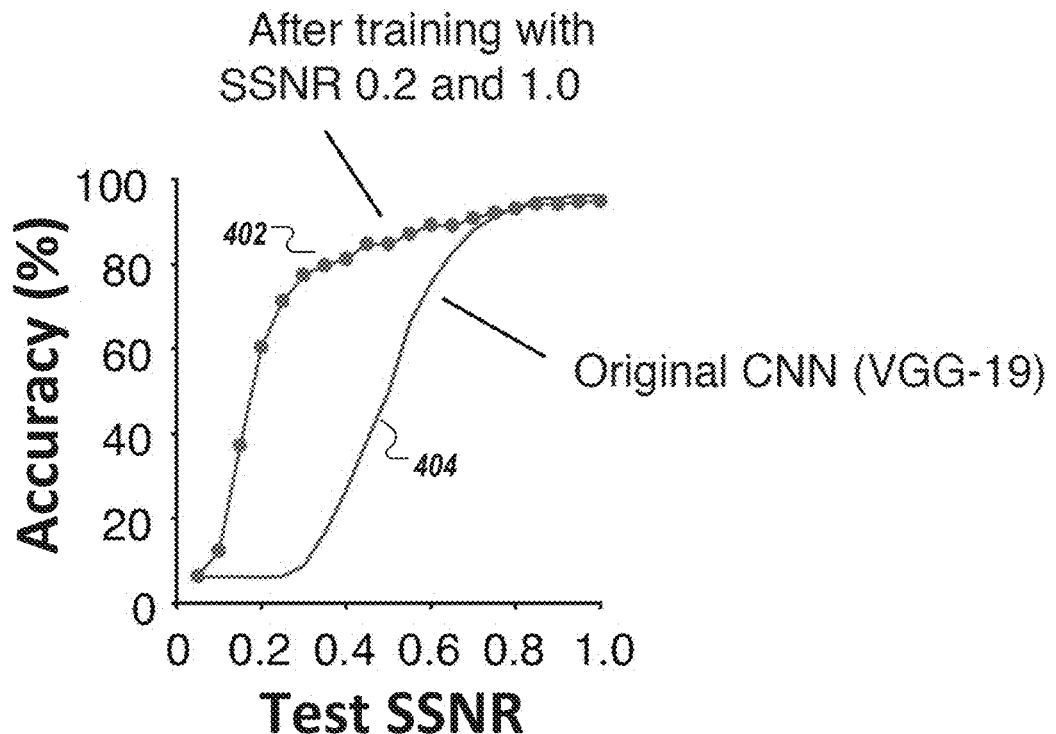

FIG. 4A shows accuracy performance for a dual-SSNR-trained CNN trained on both low SSNR images and noise-free images and for a baseline CNN trained only on noiseless images, in accordance with an illustrative embodiment.

Figure 4B:
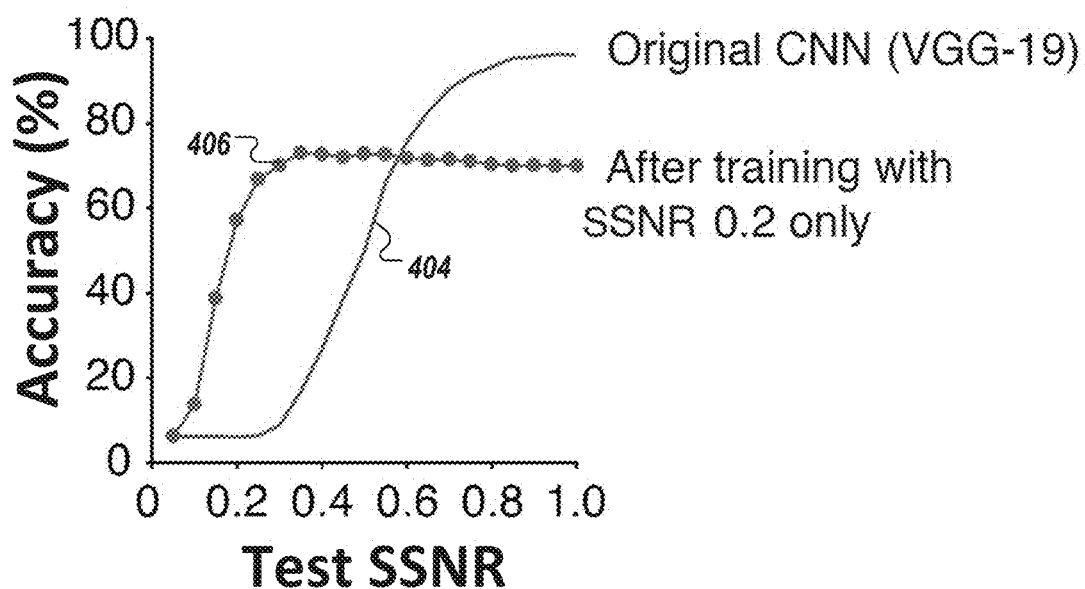

FIG. 4B shows accuracy performance when the CNN receives training only with the low SSNR images (e.g., SSNR=0.2), in accordance with an illustrative embodiment.

Figure 4C:
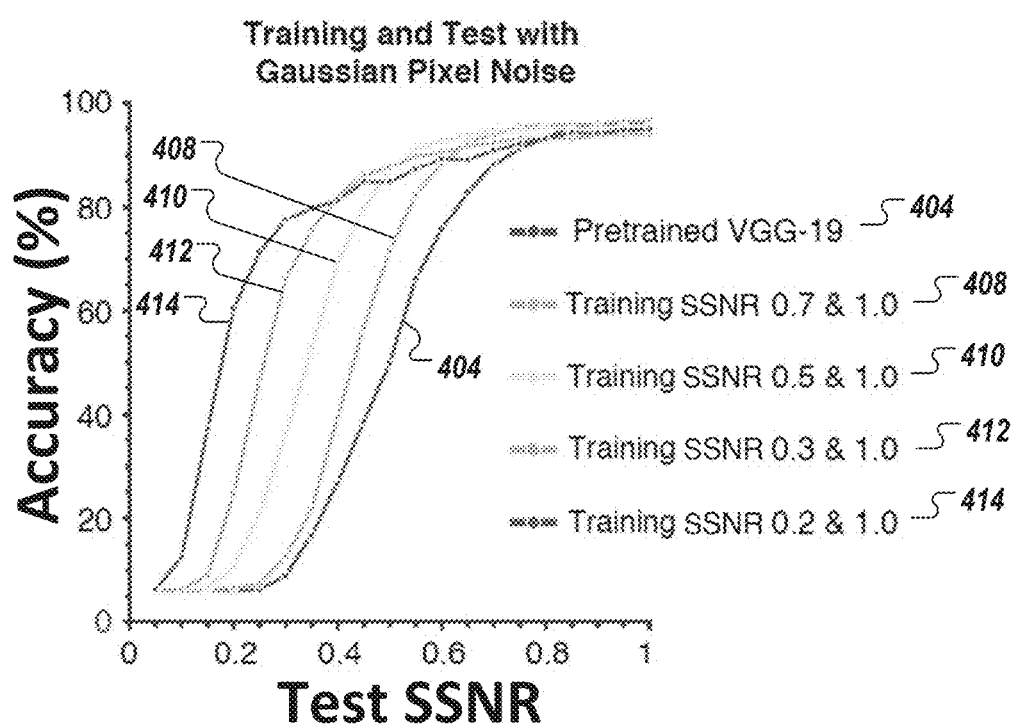

FIG. 4C shows comparative robustness performance of dual-SSNR-training at different SSNR levels, in accordance with an illustrative embodiment.

Figure 5A:
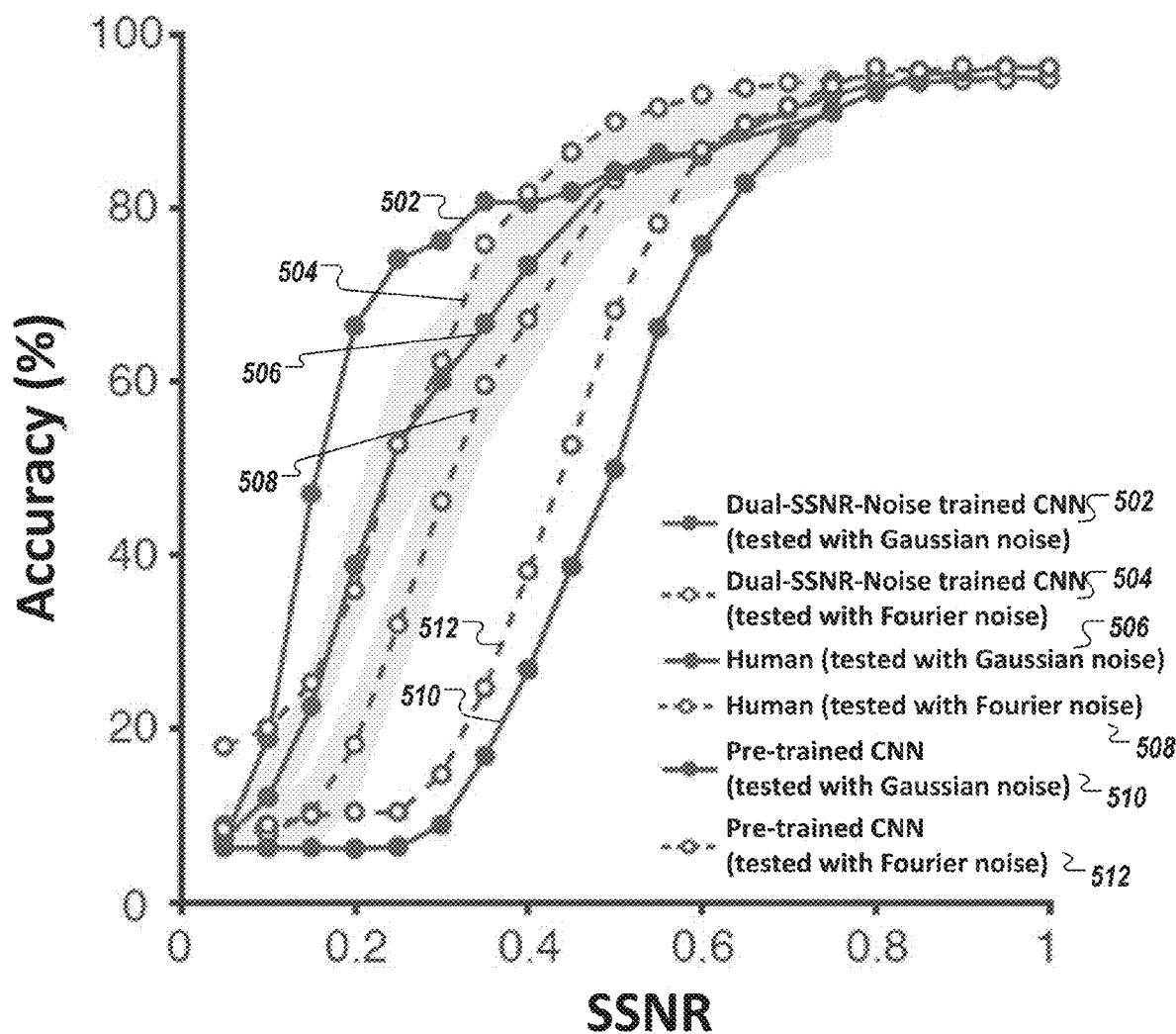

FIG. 5A shows comparative accuracy performance of four VGG-19 networks with and without the benefits of dual-SSNR noise training along with comparative accuracy performance of human counterparts at evaluating a set of noisy test images, in accordance with an illustrative embodiment.

Figure 5B:
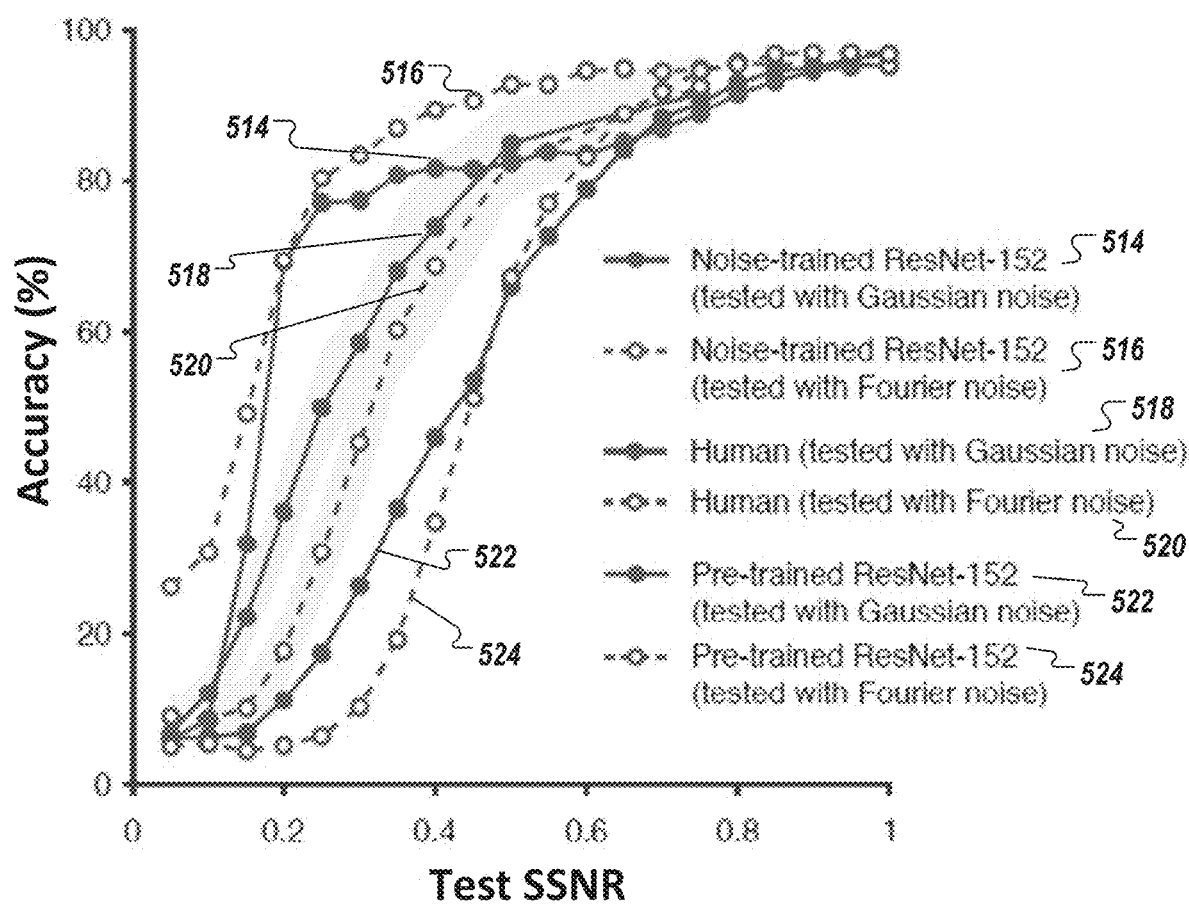

FIG. 5B shows the performance of a ResNet-152 convolutional neural network, plotted as a function of tested SSNR, for a baseline neural network (pre-trained) and a dual-SSNR trained neural network along with the performance of human counterparts at evaluating a set of noisy test images, in accordance with an illustrative embodiment.

Figure 6A:
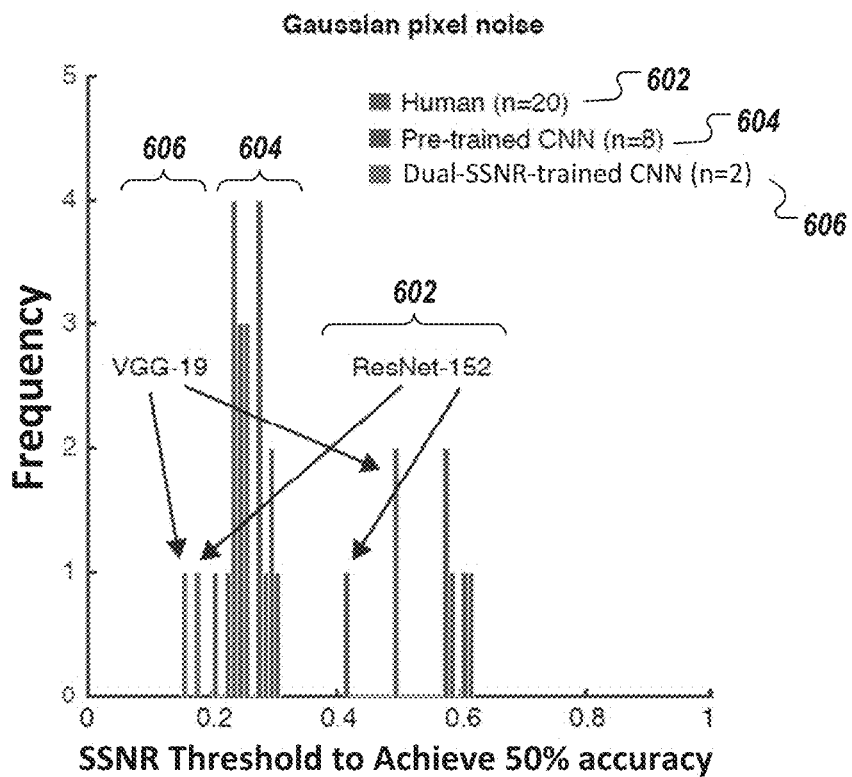
Figure 6B:
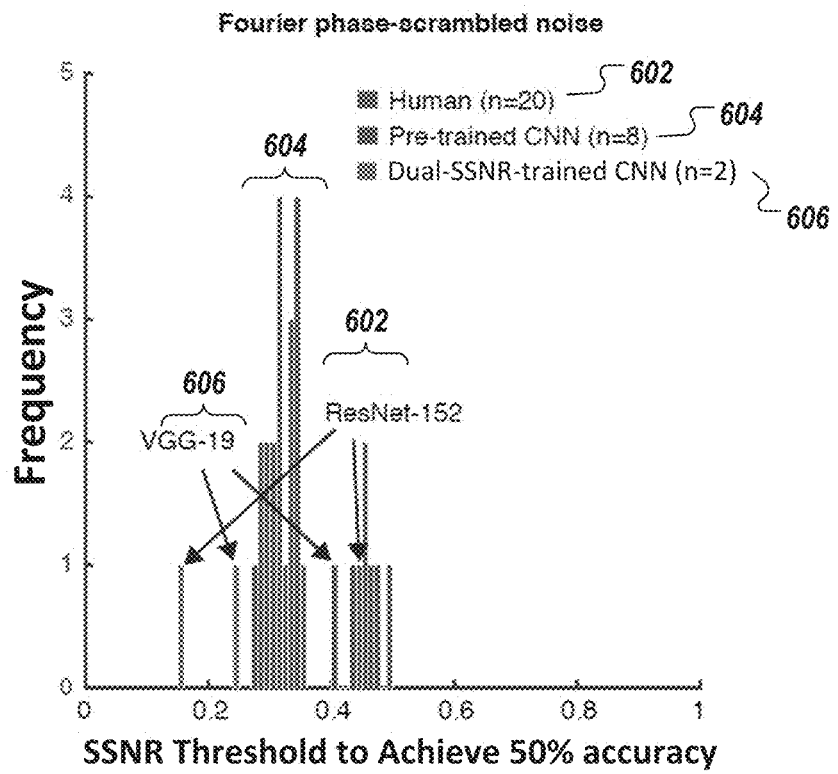

FIGS. 6A and 6B show plots (i.e., histograms) of the SSNR threshold at which dual-SSNR-trained CNNs, pre-trained CNNs, and individual human observers would achieve 50% recognition accuracy with noisy test images, in accordance with an illustrative embodiment.

Figure 7:
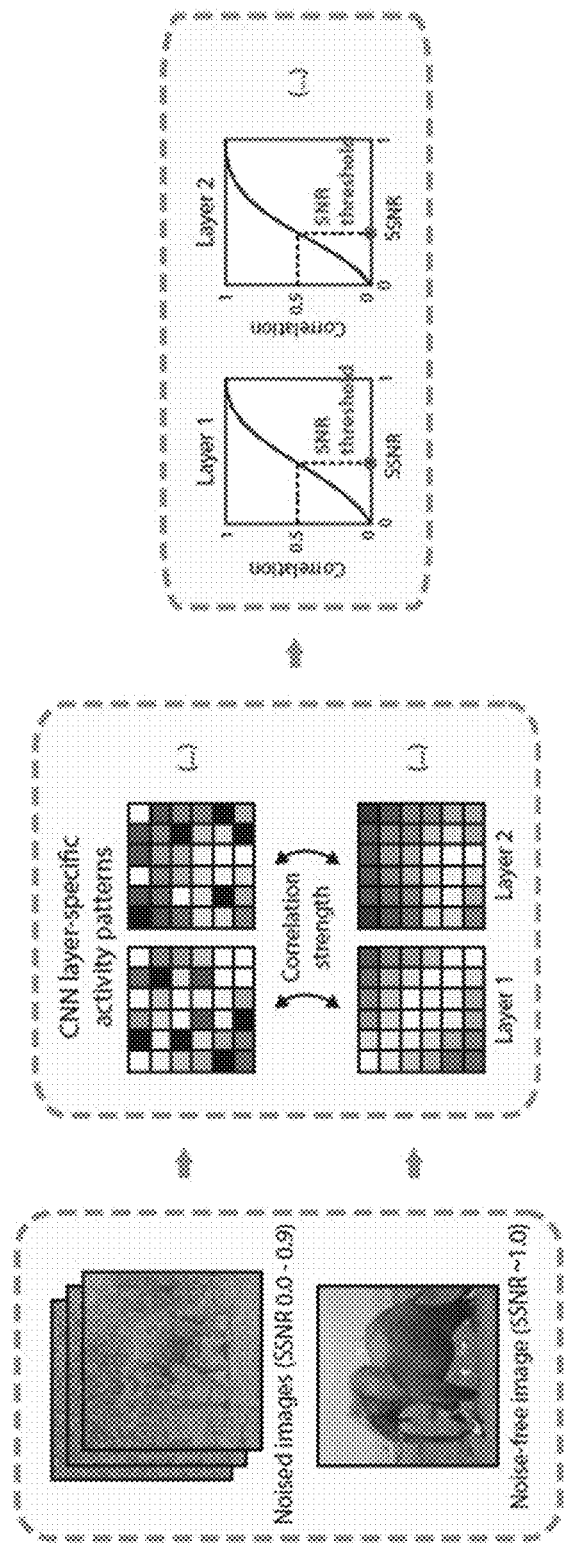

FIG. 7 shows a diagram of a layer-specific noise sensitivity analysis that can be used to evaluate dual-SSNR noise training procedures, in accordance with an illustrative embodiment.

Figure 9:
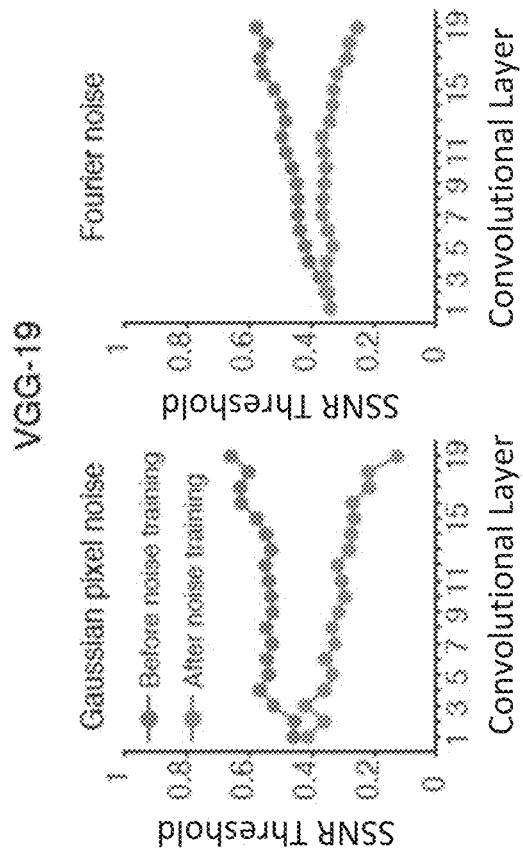
Figure 8:
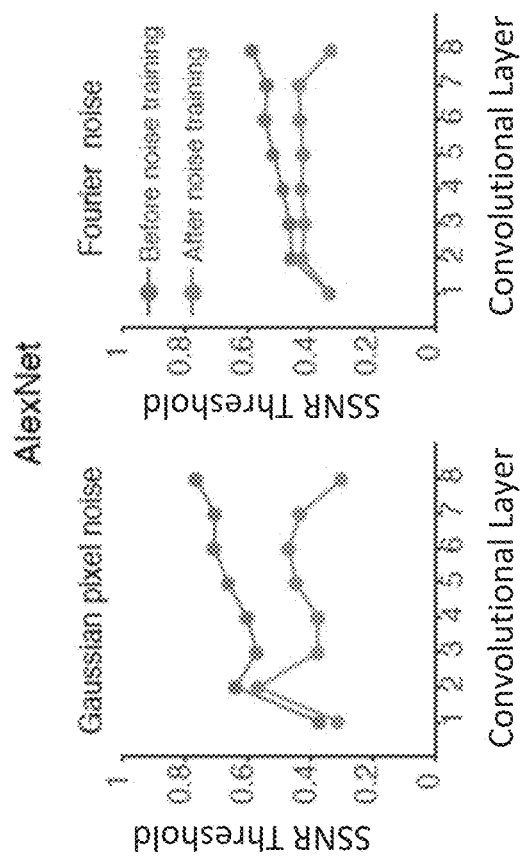

FIGS. 8 and 9 show results of the layer-wise noise sensitivity analysis of FIG. 7 for two noise-trained CNN models, in accordance with an illustrative embodiment.

Figure 10:
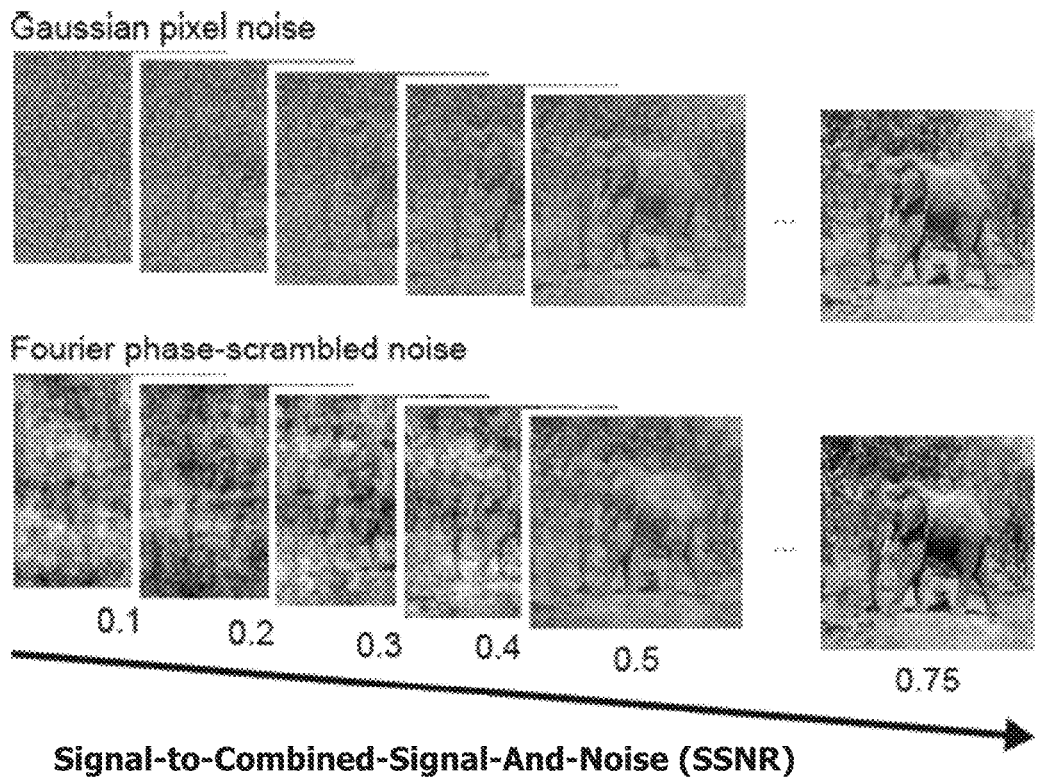

FIG. 10 shows examples of an object image embedded in spatially uncorrelated noise (e.g., Gaussian pixel noise) or spatially correlated noise (e.g., Fourier phase-scrambled noise) presented at various signal-to-combined-signal-and-noise ratios (SSNRs) as used in the evaluative study, in accordance with an illustrative embodiment.

Figure 11:
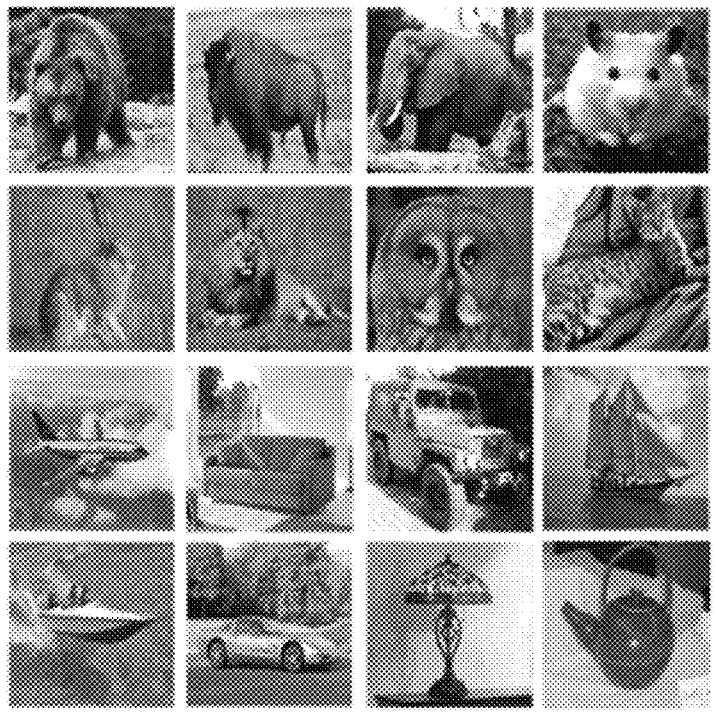

FIG. 11 shows the sixteen object categories used to evaluate recognition performance in the evaluative study, in accordance with an illustrative embodiment.

FIGS. 12A-E each shows diagrams of general architecture of existing and pretrained CNN models, which were used in the study and can be dual-SSNR-trained according to the exemplary training methodologies, in accordance with an illustrative embodiment.

Figure 13:
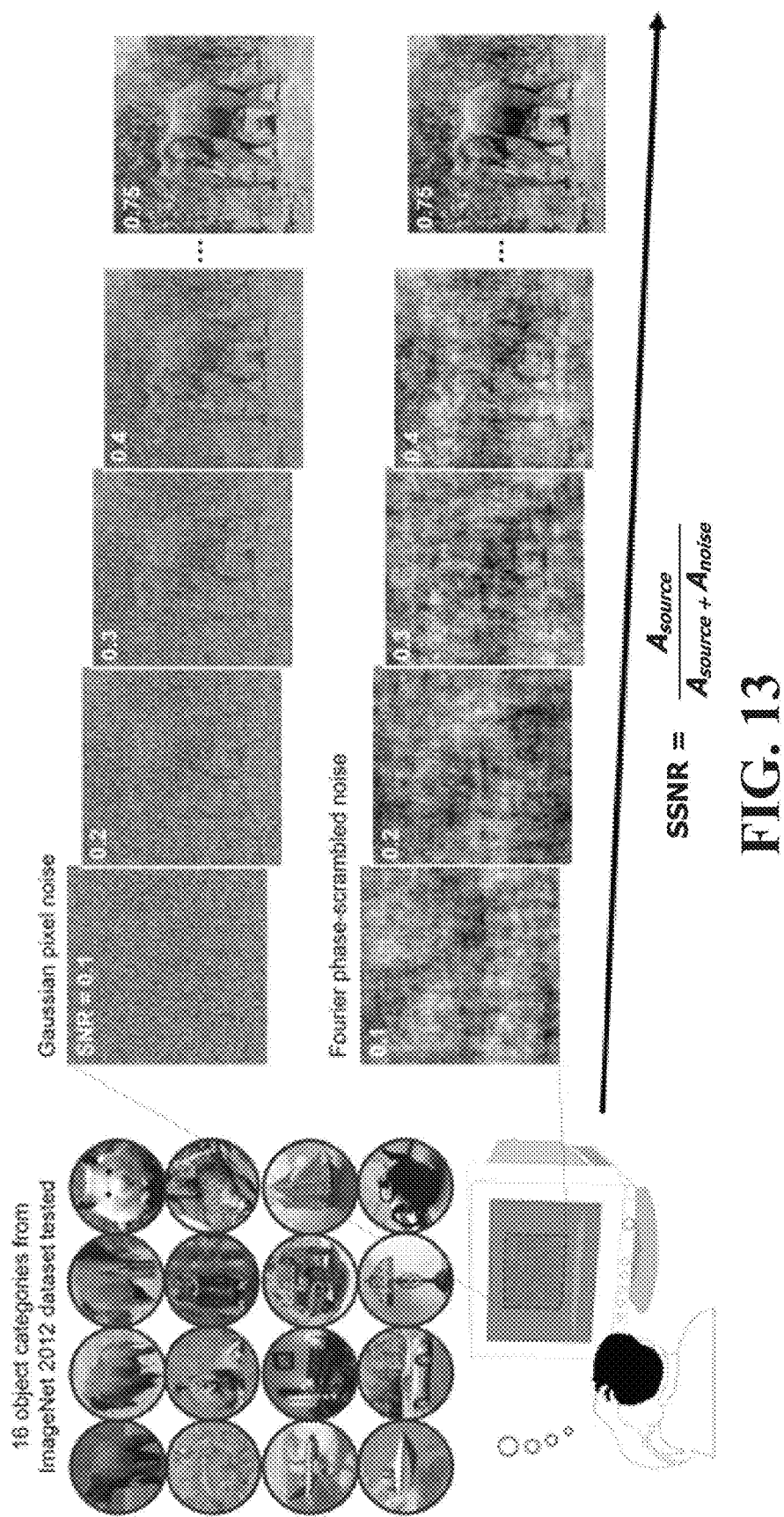

FIG. 13 shows a diagram of a study conducted with human participants to assess accuracy performance of a typical person in recognizing objects in visual noise at varying SSNR levels, in accordance with an illustrative embodiment.

Figure 14:
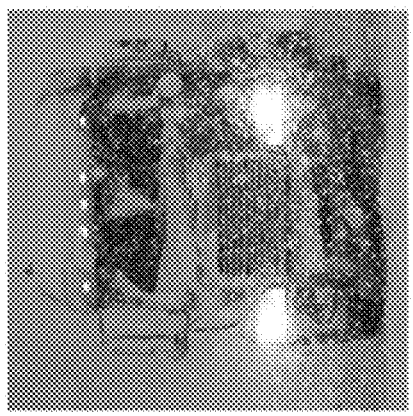
Figure 14:
Figure 14:
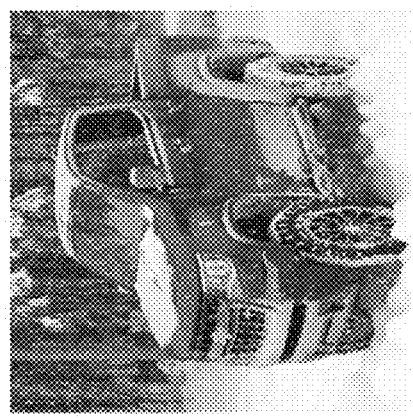
Figure 14:
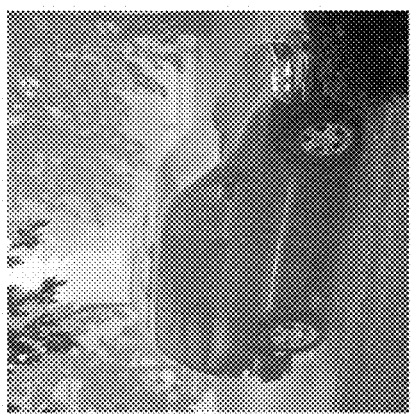
Figure 14:
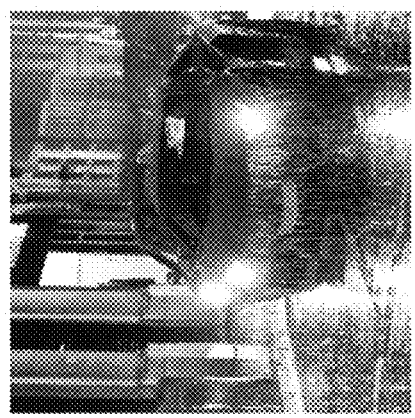
Figure 14:
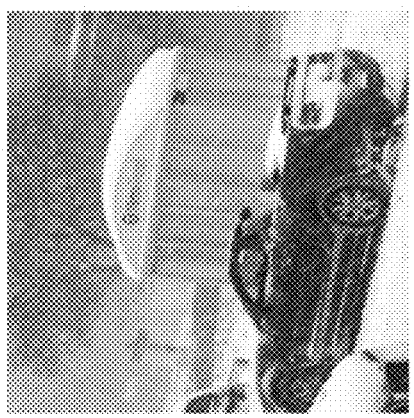
Figure 14:
Figure 14:
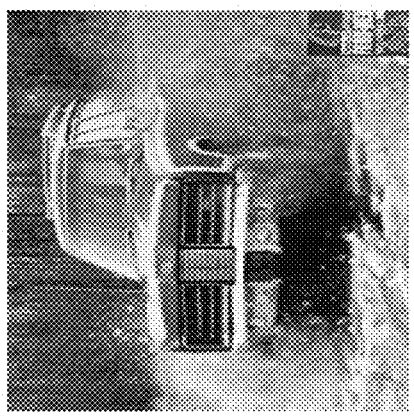

FIG. 14 shows exemplary noisy images, having real-world weather elements as noisy elements, used in a validation study of a dual-SSNR-trained CNN (e.g., trained on both low SSNR images and noise-free images), in accordance with an illustrative embodiment.

Figure 15A:
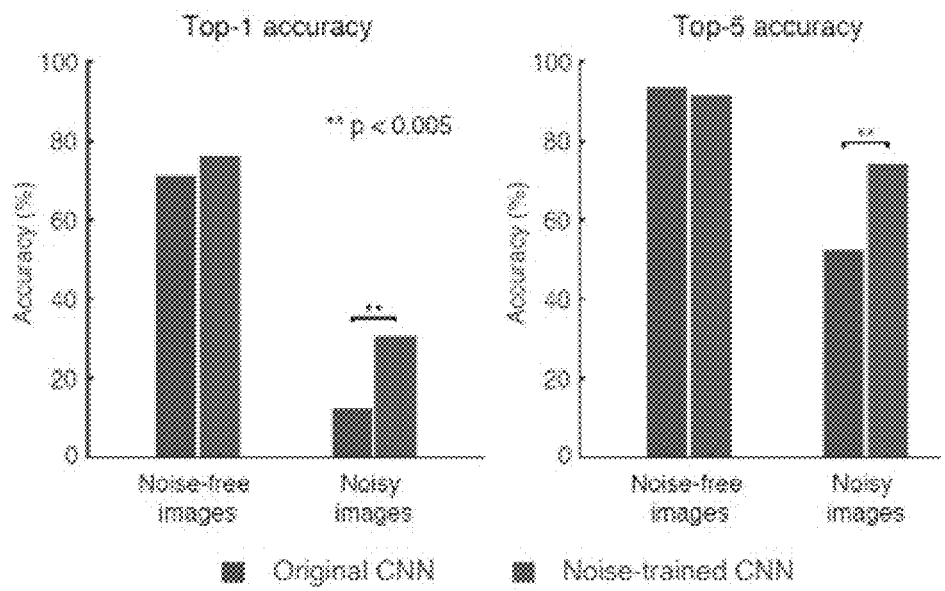

FIG. 15A shows the accuracy performance of the dual-SSNR-trained CNN at recognizing both noise-free (having no weather elements) and noisy images (having weather elements) as compared to a pre-trained version of the CNN (e.g., trained exclusively on noise-free images), in accordance with an illustrative embodiment.

Figure 15B:
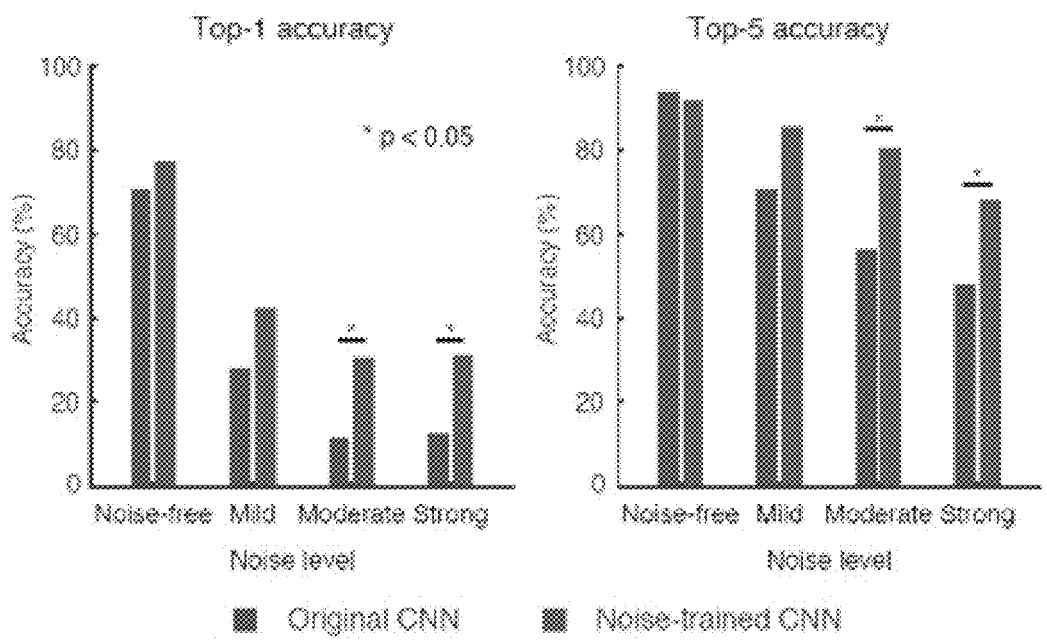

FIG. 15B shows performance of the dual-SSNR-trained CNN at recognizing differing levels of noisy images as compared to the pre-trained version of the CNN, in accordance with an illustrative embodiment.

Figure 16:
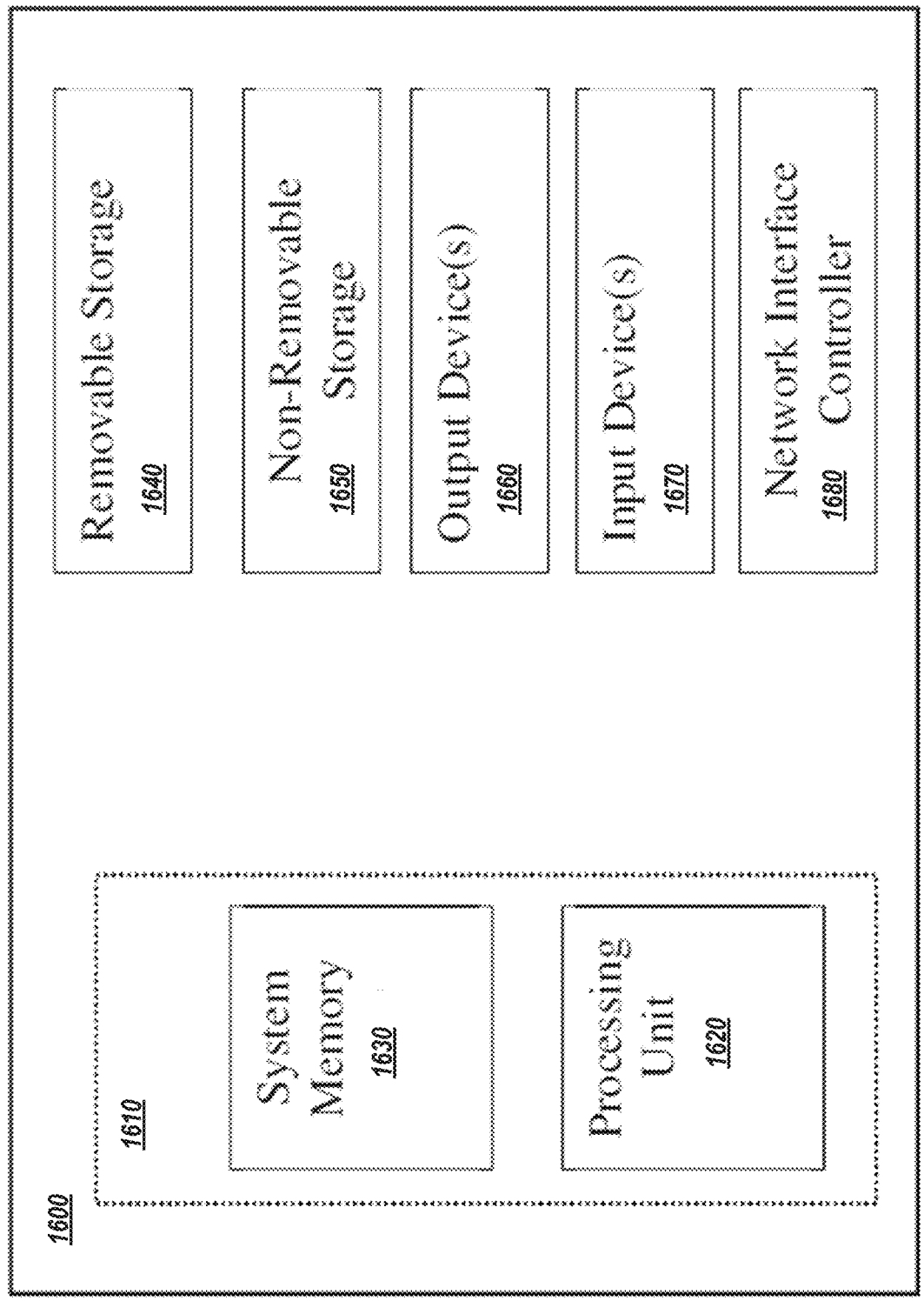

FIG. 16 is a diagram of an example computing device upon which embodiments may be implemented, in accordance with an illustrative embodiment.

DETAILED SPECIFICATION

Each and every feature described herein, and each and every combination of two or more of such features, is included within the scope of the present invention provided that the features included in such a combination are not mutually inconsistent.

FIG. 1 is a diagram of a system 100 configured to train a neural network 102 (e.g., deep neural networks such as a convolutional neural network) with noisy images 104 (e.g., low-SSNR training images) in combination with noiseless/generally noiseless images 106 or a second set of noisy images 112 (e.g., noisy training images having a high/higher SSNR level (e.g., SSNR between 0.7 and 0.99) greater than that of the low-SSNR training images 104) to generate a noise-robust neural network, in accordance with an illustrative embodiment. FIG. 2, which is discussed concurrently with FIG. 1, is a flow diagram showing a training process performed by the system of FIG. 1, in accordance with an illustrative embodiment.

As shown in FIG. 1, the system 100 includes one or more databases 108 (shown as 108a and 108b) that have stored therein a set of noiseless images or generally noiseless images 106. The terms "noiseless image" and "generally noiseless image" generally refer to digitally captured or acquired images of the natural world in which objects and/or contents within the natural images are not distorted or obfuscated by natural environmental conditions or by externally-introduced distortions or obfuscations. Noiseless and generally noiseless images include, in some embodiments, publicly accessible/available images that are accessible or available on the World Wide Web, image databases (e.g., ImageNet) as well as proprietary image and video databases (e.g., Google Street View Data), etc. Noiseless images and generally noiseless images may include optimally-acquired, and/or near optimally-acquired, real-world photos of objects, e.g., having optimally or near optimal environmental condition, e.g., optimal weather conditions and/or optimal lighting.

Referring still to FIG. 1, the system 100 includes a noisy image generation system 110 configured to obtain (step 202) noiseless images or generally noiseless images 106 from the one or more databases 108 and to generate (step 204) a set of the noisy images 104 using the set of noiseless images or generally noiseless images 106. The noisy image generation system 110, in some embodiments, applies (step 206) the generated noisy images 104 and noiseless or generally noiseless images 106 (or a different set of noiseless or generally noiseless image 106') in the training of a neural network (e.g., a deep neural network) to provide a dual-SSNR-noise trained neural network. In other embodiments, the noisy image generation system 110 generates a second set of noisy images 112 having a SSNR value higher than that of the set of the noisy images 104. This second set of noisy images 112 is used, as a substitute to or as an addition to, the noiseless images or generally noiseless images (e.g., 106 or 106') with the set of the noisy images 104 for dual-SSNR training. In some embodiments, the second set of noisy images 112 has a high or moderate SSNR value (e.g., between 0.7 and 0.99). The term "SSNR" is an abbreviation for signal-to-combined-signal-and-noise ratio.

As used herein, "noisy" training images refer to images synthesized from a source image having a range-adjusted set of pixel intensity values, performed in some manner (e.g., multiplicative attenuation and/or non-linear compression), prior to the range-adjusted image being combined with noise. The adjustment to the range is intended to reduce the strength of the signal component, or variance component, of the content of interest in the training images, which is typically embodied in the contrast or effective dynamic range of the image. The adjustment can be done by image processing following or during acquisition or by manipulation of the optics used during the acquisition of the source training image.

In some embodiments, the effective range (i.e., strength of the noise component) of the range-adjusted noise image is specified to be as large as, or larger than, the effective range (i.e., strength of the signal component) of the range-adjusted source image, prior to their combination to create the combined-noise training images.

In other embodiments, the variance (i.e., noise-associated variance) of the range-adjusted noise image is specified to be as large as, or larger than, the variance (i.e., signal-associated variance) of the range-adjusted source image, prior to their combination to create the combined-noise training images. That is, the noisy image has the variance of the pixel intensity values associated with the introduced noise exceeding the variance of the pixel intensity values associated with the source training images. Here, variance is conventionally defined as the sum of the squared deviations of the relevant set of pixel intensities values (relative to the mean pixel intensity of that set), divided by the number of pixels in that set.

As used herein, dual-SSNR-noise trained neural network (as well as "dual-SSNR noise trained CNN" or "dual-SSNR noise trained DNN") refers to a neural network that has been trained with a set of images predominantly having a first SSNR (e.g., noisy training images with SSNR lower than 1.0) and sets of images predominantly having a second SSNR (e.g., corresponding to noiseless/generally noiseless images or corresponding to a second set of noisy training images, e.g., either of which having a SSNR value higher than that of the first-SSNR training images). In some embodiments, the dual-SSNR-noise trained neural network is trained on noisy images in combination with noiseless or generally noiseless images (e.g., having SSNR near or at 1.0). In some embodiments, the dual-SSNR-noise trained neural network is trained on noisy images only, but at different SSNR levels, e.g., with a first set of training images at low SSNR and a second set of images at a higher SSNR (e.g., training on images with SSNR=0.2 and SSNR=0.8 could lead to performance that closely resembles training with SSNR=0.2 and noiseless images, or generally noiseless images (e.g., SSNR >0.95)).

It is observed that training of the neural network 102 using both noisy images (e.g., low SSNR images) and higher SSNR images (e.g., a second set of noisy images or noiseless/generally noiseless images) leads to remarkable improvements in the recognition performance accuracy of a trained deep learning network in evaluating subsequent images and videos having varying-degrees of noisy viewing conditions, including images with high levels of noise (i.e., low SSNR), as well as to provide excellent performance in noiseless or generally noiseless viewing conditions (i.e., high and moderate SSNR). Experimental data, and validation study, including that in real-world scenario, later discussed herein, provide evidence that the exemplified dual-SSNR-noise-trained networks successfully attained recognition and identification robustness (i.e., high accuracy levels in the recognition and identification of objects in images having a wide range of noise levels) that matched, and exceeded, the performance of human observers (which also exceed those of state-of-the-art pretrained networks in recognition and identification of objects in such high levels of noise).

The system 100 (e.g., 110), in some embodiments, is configured to generate low-SSNR images with spatially correlated noise (e.g., predominantly having Fourier phase-scrambled noise) and/or low-SSNR images with spatially uncorrelated pixelated noise. Indeed, the resulting neural network 102 concurrently trained with both spatially correlated and spatially uncorrelated noisy images, in combination with noiseless/generally noiseless images or a second set of noisy training images, improves robustness of recognition for a wide range of noise operations.

In some embodiments, the set of generated noisy images 104, or a portion thereof, includes a set of images having a signal-to-combined-signal-and-noise ratio (SSNR) value that is below or around the boundary of normal human perception. Boundary of normal human perception may refer to an upper boundary (i.e., a critical SSNR) at which a human observer (i.e., a person with normal healthy vision and no evidence of cognitive impairment) exhibits a reliable (i.e., statistically significant) decrement in performance accuracy at recognizing or identifying objects in noisy images in comparison, for example, to the observer's performance accuracy for the same or similar source images presented in a noise-free manner (e.g., SSNR=1.0). Indeed, even a modest decline in performance(e.g., such as a 10% decrease in accuracy that nevertheless proves statistically different from performance for noise-free images) would be an indication that the SSNR level for the noisy images is sufficiently low to fall within the upper SSNR boundary of normal human perception. Accordingly, the boundary of normal human perception extends to much lower SSNR levels, with recognition accuracy declining at progressively lower SSNR images. The lower boundary of normal human perception can be identified as a critical SSNR level at which human observers are able to perform marginally but significantly better than chance-level guessing in a recognition task with a discrete number of options for object classification responses. For example, if there are n=10 possible object category responses and all categories are presented with equal frequency, then the expected chance-level performance is $\frac{1}{10}$ or 10%.

Referring still to FIGS. 1 and 2, in some embodiments, the system 100 (e.g., 110) generates (step 204) the set of the noisy images 104 and directly inputs the generated images into the neural network training process without the set of the noisy images 104 being stored to persistent memory. In some embodiments, the system 100 (e.g., 110) stores the set of the noisy images 104 (along with the source images) as training images and/or testing images into a database 114 of low-SSNR images to be used for subsequent training (and/or testing) of a neural network. In other embodiments, the system 100 (e.g., 110) generates and stores the set of the noisy images 104 (along with the source images) to database 114 from which the images can be retrieved for training (and/or testing) of the neural network 102. The generated noisy images 104 do not have to have the same content as the noiseless images 106. That is, the generated noisy image 104 can have distinct and unique images and/or content from that of the noiseless image 106 used in co-training or dual-training by the neural network 102.

The neural network 102 may include deep neural networks (DNNs) or other artificial neural networks (ANNs), configured with multiple layers between the input and output layers. In some embodiments, the neural network 102 includes a convolutional deep neural network (CNN). In some embodiments, the neural network 102 includes a recurrent neural network (RNN). In some embodiments, the neural network 102 is selected from the group consisting of an autoencoder, a probabilistic neural network, a time delay neural network, and a convolutional neural network, deep neural network, deep convolutional network, deconvolutional network, feed-forward based neural network, recurrent based neural network, general adversarial network, and variational auto encoder. The training may be performed in a supervised or unsupervised manner.

Spatially uncorrelated pixelated noise refers to noise that is added to each pixel independently of other pixels, in which the noise is sampled from distribution of possible pixel intensities, which includes but is not limited to a Gaussian distribution, a log-Gaussian distribution, a uniform distribution, or any probability density function based on its utility. As used herein, reference to Gaussian noise (and Gaussian pixel noise) refers to a specific type of spatially uncorrelated noise, to which any of the other type of spatially uncorrelated noise distribution(s) can be used as a substitute.

Spatially correlated noise refers to noise that is spatially structured and spatially correlated, for example, but not limited to Fourier phase-scrambled noise, and the like, resembling something akin to clouds or fog. As used herein, reference to Fourier noise (and Fourier phase-scrambled noise) refers to a specific type of spatially correlated noise, to which any of the other type of spatially correlated noise distribution(s) can be used as a substitute. Spatially correlated noise images can be mathematically-generated (e.g., from a mathematical relationship or definition) by using a frequency power spectrum that follows a $1/F^\alpha$ profile or other such similar profile, selecting arbitrary or random phase values, and creating images through application of the inverse Fourier transform. In other embodiments, the spatially correlated noise images are numerically-generated (e.g., arbitrary defined) using a frequency power spectrum that follows a user-defined distribution profile to select arbitrary or random phase values.

FIG. 3 is a diagram showing examples of noisy images 104 generated at varying levels of SSNR in which the introduced noise is spatially uncorrelated (e.g., Gaussian pixel noise) or spatially correlated (e.g., Fourier phase-scrambled noise), in accordance with an illustrative embodiment. In FIG. 3, combined-noise images derived from the same source image are shown with varying SSNR values, including "0.75" (302, 314), "0.5" (304, 316), "0.4" (306, 318), "0.3" (308, 320), "0.2" (310, 322), and "0.1" (312, 324).

Indeed, the system 100 is configured to generate noisy training images that can span a wide range of signal-to-combined-signal-and-noise ratios (SSNR). Critically, in some embodiments, it is necessary to reduce the effective range of the original source image (i.e., strength or variance of signal components of contents of interest in the source image), prior to its combination with the noise image or noise elements. The reduction in the effective range of the source image reduces the signal strength or variance of the content portion of the source image to which the introduced noise can push the SSNR of the image to a sufficiently low value to challenge the limits of human perceptual ability.

It should be noted that simply introducing or applying noise (e.g., additive noise) to a source image may not generate a resulting training image (i.e., a low-SSNR image or noisy image) with sufficiently low SSNR as the original dynamic range (strength, variance, and/or contrast) of the source image may be too high so as to introduce "clipping" artifacts or saturation when the noise is applied. The exemplary methodology can be beneficially used to generate very large or high numbers of training and/or testing images as is often necessary to sufficiently train and test a deep neural network.

In comparison, adding noise to the original image without first reducing the effective range (e.g., strength or variance of the content of interest) can introduce clipping as the pattern of added noise is not evenly distributed throughout the image. Thus, the impact of simply adding noise directly to a source image can be locally asymmetric. For example, a white car can only have darker pixels added to it, not brighter ones. Also, if very high levels of noise are added to a source image that contains a high-contrast object, such as a white car on a black road, the outline of that object may still remain visible.

To generate a noisy training image and/or a low-SSNR image, in some embodiments, the noise that is added is statistically independent of the properties of the original source image. It can be assumed that an original source image (S) consists of either a 2D matrix of luminance values for each pixel, or alternatively, a 3D matrix with separate RGB values for each pixel. A noise image (N) with the same matrix size (or noise elements bounded within a similar matrix size) can be generated to consist of either spatially uncorrelated noise and/or spatially correlated noise with the same allowable range of pixel intensity values (e.g., 0 to x).

The system can assume that the to-be-generated training image has the same allowable range of pixel intensity values (e.g., 0 to x) as the source image and noise image. Should the allowable range of pixel intensity values differ between source image, noise image and/or training image, multiplicative scaling (followed by digitization) can be applied as necessary, and the equations described herein can be readily extrapolated to these situations.

The contrast of an image is defined, in some embodiments, per Equation 1.

$$\text{Contrast} = \frac{\text{Maximum intensity} - \text{Minimum intensity}}{\text{Maximum intensity} + \text{Minimum intensity}} \quad \text{(Equation 1)}$$

Although the minimum and maximum intensity values in an original source image (e.g., obtained from ImageNet or other image databases) often do not span a full range of the image (e.g., from 0 to 1 in a normalized scale; 0 to 255 for 8-bit images; 0 to 65,535 for 16-bit images, etc., e.g., for 12-bits, 24 bits, 32 bits), the images are considered generally clear and with high contrast. These original images may be considered to be noiseless or generally noiseless.

The ease with which a signal can be detected in the presence of noise depends on the strength of the signal relative to the strength of the noise, a measure described as the signal-to-noise ratio. According to most conventions, signal-to-noise ratio (SNR) can be mathematically defined as the power (or variance) of the signal divided by the power (or variance) of the noise. Thus, for situations in which the noise approaches a value of zero, the SNR approaches a value of infinity. According to this definition, SNR can range from 0 to $\infty$.

In contrast with SNR, SSNRs are bounded (e.g., between 0 and 1, though other ranges can apply) as this measure characterizes the fractional proportion of a signal in a training image that arises from a given source image when combined with noise, rather than from the noise alone.

In some embodiments, a training image (T) with a signal-to-combined-signal-and-noise ratio (SSNR) lower than 1.0 is created by reducing the effective range (or contribution) of the source image by a multiplicative attenuating factor, $A_{source}$. The system also adjusts, in some embodiments, the effective range (or contribution) of the noise image by a multiplicative attenuating factor $A_{noise}$ prior to the combination of the range-adjusted source image and range-adjusted noise image.

The resulting training image can be described per Equation 2.

$$\text{Training image } (T) = S \times A_{source} + N \times A_{noise} + k \quad \text{(Equation 2)}$$

The original source image (S) and the noise image are each weighted by a multiplicative attenuating factor $A_{source}$ and $A_{noise}$, respectively, and where k is an additive term that can be used to re-center the mean intensity of the image, if necessary.

In some embodiments, it is preferable to set k=0, in which case, Equation 2 can be simplified to Equation 3.

$$\text{Training image } (T) = S \times A_{source} + N \times A_{noise} \quad \text{(Equation 3)}$$

To ensure that the resulting training image falls within the same dynamic range as the source image and the noise image (from 0 to x), in some embodiments, $A_{source} + A_{noise} \leq 1.0$.

In some embodiments, it is useful to describe this measure of SSNR, e.g., bounded between 0 and 1, based on multiplicative attenuating factors, as follows per Equation 4.

$$\text{SSNR of Training Image} = \frac{A_{source}}{A_{source} + A_{noise}} \quad \text{(Equation 4)}$$

It may be computationally preferable to set $A_{source} + A_{noise} = 1.0$, such that the SSNR of the training image is equal to $A_{source}$. That is, in some embodiments, $A_{source} = 1 - A_{noise}$ or $A_{noise} = 1 - A_{source}$.

The above definition of SSNR in Equation 4 relies on a simplifying assumption that the variance (or standard deviation) of the pixel intensity values for the source image and the noise image are comparable in magnitude.

In other embodiments, particularly when the variance of the pixel intensities of the original noise image (with range 0 to x) is quite different in magnitude from the variance of the pixel intensities of the source image (with range 0 to x), it is preferable to describe the SSNR of the training image according to the standard deviation of the range-adjusted source image ($\sigma_{adjusted\ source}$) and the standard deviation of the range-adjusted noise image ($\sigma_{adjusted\ noise}$). This alternative measure of SSNR, bounded between 0 and 1, based on standard deviation, can be described by Equation 5.

$$\text{SSNR of training image} = \frac{\sigma_{adjustedsource}}{\sigma_{adjustedsource} + \sigma_{adjustednoise}} \quad \text{(Equation 5)}$$

The system can translate between the above measure of SSNR, which is bounded between 0 and 1, and the conventional measure of SNR. Using the same measures in Equation 5 to quantify the standard deviation of the range-adjusted source image ($\sigma_{adjusted\ source}$) and the standard deviation of the range-adjusted noise image ($\sigma_{adjusted\ noise}$), Equation 6 can be used to calculate the conventional measure of SNR that is bounded between 0 and infinity.

$$\text{Conventional SNR (with range from 0 to } \infty) = \frac{\sigma^2_{adjustedsource}}{\sigma^2_{adjustednoise}} \quad \text{(Equation 6)}$$

It is contemplated that other methods may be used to measure the variance of pixel intensities in an image or the amount of "power" or "strength" in an image. For example, one alternative approach would be to quantify the amplitude or power of the responses in the Fourier domain. In such case, the system would obtain a measure of power at multiple spatial frequencies. Another alternative approach would be to calculate the strength of local responses to an image by using Gabor wavelets to simulate the response of V1 neurons. In this case, the system is configured to obtain a measure of the strength of the response to local portions of the image across a range of orientations and spatial scales. In principle, the system could adopt some type of omnibus measure of power based on Fourier power or on Gabor wavelet analysis and apply this measure to both source images and noise images to calculate SSNR and SNR.

Indeed, values of a substantial portion of the pixels of the source image are adjusted to reduce an effective range (e.g., dynamic range) of the image or contents of interest therein. The reduction can be for any amount so long as it would allow the resulting SSNR to reach a sufficiently low value (e.g., 0.2, 0.3, 0.4, 0.5, etc.) necessary for the neural network training.

It is contemplated that other methodology may be applied to generate a low-SSNR image, including those that employ an additive/subtractive operative, a multiplicative/divisive operation, a (non-linear) compression operation, or a combination thereof.

It is generally understood that a subtractive operation could be performed to produce equivalent results to an additive operation, and that a divisive operation could be performed to produce equivalent results to a multiplicative operation. A multiplicative or divisive operation could be performed in combination with additive or subtractive operation to make meaningful low-SSNR noise images. In some embodiments, a masking operation, e.g., is used to replace source pixels, in effect acting as an "occluder" for the original image.

In some embodiments, the introduced noise comprises a plurality of image elements having a semi-opaque component and/or an opaque component (e.g., having an appearance of snow fall, rain fall, hail, etc.), e.g., where the semi-opaque component and/or the opaque component are generated by an attenuation operation, a reflectance operation, a local blurring operation, a masking or element replacement operation, and/or a combination thereof. Snowflakes, for example, may be modeled to alter pixels of an image by affecting attenuation (e.g., by filtering out either partially or completely the source image pixel) and reflectance (e.g., by having snowflake elements reflect light directly). Rain, for example, may be modeled as local blurring effect to the pixels behind individual rain drops.

In addition to images, video data can be similarly processed as frames, e.g., via singular frame or multiple frames (e.g., combined via an averaging operation, or selected as a representative frame). Spatiotemporal correlated noise elements can be added among frames of the same video. Spatiotemporal uncorrelated noise elements among video frames may also be used, e.g., by generating an independent noise image for each frame, or a set of combined frames.

Referring still to FIG. 3, the shown SSNR-varied images with spatially uncorrelated noise (302-312) were created from noise images generated with a random Gaussian distribution (e.g., with standard deviation set to ⅙ of the dynamic range) of luminance values. If the noise images are instead created by sampling from a different distribution of possible intensity values, such as a uniform distribution (with values in the original noise image allowed to vary from 0 to 1), the resulting noise image would have a larger standard deviation of intensity values. As a consequence, the visibility of training images would become degraded at a comparatively higher SSNR, when compared to training images with spatially uncorrelated Gaussian noise with the standard deviation as specified.

Images with spatially correlated noise can be generated in the Fourier or frequency domain by applying the Fourier transform to the source image while preserving the amplitude/power spectrum of the source image and introducing randomization or perturbations to the phase component, prior to applying the inverse Fourier transform. The power spectrum of real-world images can be approximated by the function $1/F^\alpha$ in the Fourier domain, where F refers to spatial frequency. Estimated values of a may range from 1.0 to 3.0 for individual images and with an average value close to 2.0. Of course, other values for a may be used.

Also, noise images can be mathematically-generated (from a mathematical relationship or definition) by, e.g., using a frequency power spectrum that follows a $1/F^\alpha$ profile or other such similar profile, selecting arbitrary or random phase values, and creating images through application of the inverse Fourier transform. In some embodiments, the noise images are numerically-generated (e.g., arbitrary defined) using a frequency power spectrum that follows a user-defined distribution profile to select arbitrary or random phase values (also to which the inverse Fourier transform can then be applied).

Spatially uncorrelated pixelated noise and spatially correlated noise can severely impair recognition performance.

Experimental Results

FIGS. 4A, 4B, 4C, 5A, 5B, 6A, and 6B each shows robustness performance results, and/or comparative results, of a noise-robust neural network 102.

It is observed that the dual-SSNR training of CNNs and other DNNs on both noisy training images (e.g., low SSNR images) and noiseless, or generally noise-less images (or a second set of noisy training images having a SSNR value greater than the noisy training images) can result in a CNN/DNN that has high recognition accuracy performance (i.e., robustness) across a large range of test SSNRs (e.g., as compared to a CNN/DNN trained with only noiseless images). To confirm/test the general applicability of the dual-SSNR trained CNN at recognizing and identifying broad classes of objects not used in the training, a validation test was conducted with combined-noise images derived from another set of images different from those used or associated with the training.

FIG. 4A shows accuracy performance for a dual-SSNR-trained CNN trained on both low SSNR images and noise-free images (shown as "After training with SSNR 0.2 and 1.0" 402) and for the same CNN trained, as a baseline, only on noiseless images (shown as "Original CNN (VGG-19)" 404), in accordance with an illustrative embodiment. It is observed that recognition accuracy performance of the dual-SSNR trained CNN (402) is comparable to that of the baseline CNN (404) in the high SSNR range (from SSNR 0.7 to 1.0) and remarkably outperforms the baseline at low and mid-level SSNRs (from SSNR >0.1 to 0.7).

FIG. 4B shows comparative accuracy performance when the CNN receives training only with the low SSNR images (e.g., SSNR=0.2), in accordance with an illustrative embodiment. That is, the CNN is trained with noisy images each having a single low SSNR value. It is observed that the performance of the singular-SSNR trained CNN (line 406) is higher, compared to the baseline 404, for test images for only a certain portion of the SSNR range (e.g., at the low SSNR), and the performance is lower for higher SSNR and noiseless test images. Indeed, the dual-SSNR training provides a different more beneficial performance as compared to singular-SSNR training.

As noted above, the system (e.g., 100) can dual-SSNR-train a CNN on noisy images only, e.g., by presenting a first set of training images at low SSNR and a second set of images at a higher SSNR. The resulting dual-SSNR trained CNN can obtain robustness performance similar to that shown in FIG. 4B. For example, training on images with SSNR=0.2 and SSNR=0.8 could lead to performance that closely resembles training with SSNR=0.2 and noiseless images, or generally noiseless images (e.g., SSNR >0.95).

FIG. 4C shows comparative robustness performance of dual-SSNR-training at different SSNR levels, in accordance with an illustrative embodiment.

In FIG. 4C, five different training configurations were applied to the neural network: (i) a baseline in which the CNN was trained only on noiseless images (shown as "Pre-trained CNN (VGG-19)" 404); (ii) dual-SSNR training at SSNR=0.7 and SSNR=1.0 (line 408); (iii) dual-SSNR training at SSNR=0.5 and SSNR=1.0 (line 410); (iv) dual-SSNR training at SSNR=0.3 and SSNR=1.0 (line 412); and (v) dual-SSNR training at SSNR=0.2 and SSNR=1.0 (line 414).

As shown in FIG. 4C, the dual-SSNR-trained CNN becomes more robust when trained with progressively lower SSNR images (in combination with noiseless, or generally noiseless, images). That is, in FIG. 4C, a consistent leftward shift of the accuracy performance can be observed in the test SSNR curve from a baseline training performed with noiseless images only (line 404) and then with dual-SSNR training with images having different varied SSNR values (lines 408, 410, 412, and then 414). Remarkably, FIG. 4C shows that dual-SSNR training with an extreme low SSNR level of 0.2 leads to a most noise-resistant performance within this evaluation. Though, it is noted that for training images with extremely low SNR images (e.g., less than 0.1), the potential benefits of noise training may become less consistent or stable. Without wishing to be bound to a particular theory, as SSNR approaches a minimum value of 0, the amount of relevant object information to be learned or extracted from a noisy image likewise approaches 0.

FIGS. 5A, 5B, 6A, and 6B each shows the overall performance evaluation of dual-SSNR trained neural networks in relation to that of human counterparts and baseline neural networks.

Specifically, FIG. 5A shows comparative accuracy performance of four VGG-19 networks with and without the benefits of dual-SSNR noise training along with comparative accuracy performance of human counterparts at evaluating a set of noisy test images, in accordance with an illustrative embodiment. As shown, FIG. 5A includes: (1) performance of a dual-SSNR-noise trained CNN evaluated with test images corrupted with spatially uncorrelated noise, in this case, Gaussian pixel noise (502); (2) performance of a dual-SSNR-noise trained CNN evaluated with test images corrupted with spatially correlated noise, in this case, Fourier noise (504); (3) performance of a pre-trained CNN (VGG-19) that was exclusively pre-trained on noise-free images, then evaluated with test images corrupted with Gaussian noise (510); (4) performance of a pre-trained CNN evaluated with test images corrupted with Fourier noise (512). Dual-SSNR noise trained CNNs were trained on the set of low-SSNR images (SSNR=0.2) in combination with noiseless images (SSNR=1.0). The data associated with the averaged performance of human observers (N=20) evaluated with test images corrupted with Gaussian noise (506) and Fourier noise (508) are also shown.

Notably, as shown in FIG. 5A, the accuracy performance of the dual-SSNR noise-trained CNNs (502 and 504) is significantly higher than that of the pre-trained CNNs (510 and 512) at recognizing objects in images corrupted by Gaussian pixel noise or by Fourier noise. As shown in FIG. 5A, line 502, the dual-SSNR noise-trained CNN has higher accuracy performance (502) when tested with images corrupted by Gaussian pixel noise, as compared to the pre-trained CNNs, in the low SSNRs (e.g., including between 0.1 and 0.7) and generally matched the performance of the noiseless-image-trained CNN at the higher SSNR values (above 0.7). It is also observed that the dual-SSNR noise-trained CNNs have higher accuracy performance across a wide range of tested SSNR levels for images corrupted with Fourier noise (504 compared to 512).

Further, it is also shown that the accuracy performance of the dual-SSNR noise-trained CNNs (502 and 504) is significantly higher than that of human observers (N=20) evaluating the same set of noisy test images (506 and 508). As shown in FIG. 5A, line 502, the dual-SSNR noise-trained CNNs have higher accuracy performance (502) when tested with images corrupted by Gaussian pixel noise, as compared to human counterparts (line 506, shaded gray region shows ±1 standard deviation), in the low SSNRs (e.g., between 0.1 and 0.5) and generally matched that of the human counterparts at the higher SSNR values. It is also observed that the dual-SSNR noise-trained CNNs have higher accuracy performance (504) than human participants across most of the range of tested SSNRs for images corrupted with Fourier noise (504 compared to 508).

The study also applied system 100 on a very deep neural network to evaluate the generality of the exemplary dual-SSNR training methods. The study evaluated the performance of ResNet-152, a very deep CNN with 152 layers that was developed by researchers from Microsoft Research (He, Zhang, Ren, and Sun, 2015). ResNet was the winner of the classification test in the 2015 ImageNet Large Scale Visual Recognition Challenge.

FIG. 5B shows the performance of ResNet-152, plotted as a function of tested SSNR, for a baseline neural network (lines 522 and 524) and a dual-SSNR trained neural network (lines 514 and 516). The baseline neural network is the pre-trained ResNet-152. The dual-SSNR trained neural network was trained with noisy images (SSNR=0.2) and noiseless images (SSNR =1.0). For dual-SSNR training, a single version of ResNet-152 network was concurrently trained on spatially uncorrelated Gaussian pixel noise and spatially correlated Fourier phase-scrambled noise. It is observed that dual-SSNR training with both type of noises leads to excellent performance with both types of noise. That is, it was also observed that when a single CNN was dual-SSNR-trained on both Gaussian pixel noise and Fourier phase-scrambled noise, in conjunction with noise-free images, the CNN was able to achieve robustness to both types of noise.

As shown in FIG. 5B, the performance of the baseline ResNet-152 (lines 522 and 524) at classifying low SSNR images is poorer than that of the human observers tested in this study (lines 518 and 520). After the dual-SSNR noise training however (lines 514 and 516), noise-robust ResNet performed substantially better than the baseline pre-trained version (lines 522 and 524), and moreover, it surpassed the average accuracy performance of the human observers (lines 518 and 520).

FIGS. 6A and 6B show plots (i.e., histograms) of the SSNR threshold at which the CNN or individual human observer would achieve 50% recognition accuracy with the noisy test images, in accordance with an illustrative embodiment. That is, each of FIGS. 6A and 6B shows a frequency histogram indicating the critical SSNR threshold needed to achieve 50% accuracy in which bars positioned further to the left indicate instances of greater robustness to noise.

As shown, the histogram includes performance at SSNR threshold values for all 20 human observers (602), for 8 CNNs trained using only noiseless images (604), and the two dual-SSNR-noise-trained CNNs (606) (a RestNet-152 CNN and a VGG-19 CNN each co-trained on spatially uncorrelated Gaussian-pixel-noised images and on spatially correlated Fourier phase-scrambled noised images in combination with noiseless images). The SSNR threshold was selected for reliable recognition by fitting a 4-parameter sigmoid logistic function to each participant's recognition accuracy data plotted as a function of SSNR level. The SSNR level needed to attain 50% recognition accuracy was identified as the SSNR threshold of that participant; a lower SSNR threshold indicates greater robustness to visual noise. Data points that lie further to the left indicate greater robustness to noise.

As shown in FIGS. 6A and 6B, the two dual-SSNR-noise trained CNNs (VGG-19 and ResNet-152) outperformed all 20 human observers tested in the study at recognizing objects in high levels of visual noise. In particular, it is observed that the two dual-SSNR-noised trained CNNs (606) achieved 50% recognition accuracy at a lower SSNR threshold. Further, it is observed that the same 20 human observers (602) outperformed all of the pretrained baseline CNNs (604) by a considerable margin under the same evaluation criterion.

FIGS. 4A-4C, 5A-5B, and 6A-6B are evidence that the exemplified dual-SSNR-training protocol for deep neural networks improves the robustness of CNNs and other DNNs such that the resulting noised-robust trained deep neural network can match and even surpass human performance when dealing with objects in all levels of visual noise, particularly in high levels of visual noise. Further, the figures show that the exemplified dual-SSNR-training protocol surpasses performance of pre-trained state-of-the-art CNNs.

FIG. 7 shows a diagram of a layer-specific noise sensitivity analysis that can be used to evaluate dual-SSNR noise training procedures, in accordance with an illustrative embodiment. The analysis can be used to gain some insight into the changes that occur within the network following dual-SSNR noise training procedures. As shown in FIG. 7, the analysis calculates the correlation strength between the pattern of activity evoked by a noise-free image with the patterns evoked by that same image when presented at various SSNR levels. As the SSNR level of the image decreases, the correlation between the responses to the noisy image and responses to the noise-free image will likewise decrease. The analysis fits a sigmoid function to this measure of correlation strength as a function of SSNR and identifies the critical SSNR threshold needed to achieve R=0.50. Again here, a lower SSNR threshold indicates lower noise sensitivity or greater robustness to noise.

FIGS. 8 and 9 show results of the layer-wise noise sensitivity analysis of FIG. 7 for two SSNR-noise-trained CNN models, in accordance with an illustrative embodiment. As shown in FIGS. 8 and 9, each shows the results of this layer-wise noise sensitivity analysis for two noise-trained CNN models, AlexNet (FIG. 8) and VGG-19 (FIG. 9). Indeed, FIGS. 8 and 9 show example characteristics of neural networks that have been trained with a combination of low-SSNR training images and of noiseless or generally noiseless images (e.g., to achieve robustness).

As shown in FIGS. 8 and 9, AlexNet is more sensitive than VGG-19 to noise and both pretrained networks are more susceptible to Gaussian pixel noise. Prior to noise training, both networks exhibited a gradual increase in noise sensitivity in progressively higher layers, implying that the contaminating effect of visual noise tends to become amplified across successive stages of feedforward processing, leading to greater noise sensitivity in the higher layers of the network. After the system applied the low-SSNR noise-training procedure however, both networks showed considerable improvement, especially in the middle and higher layers where the pre-training and post-training noise sensitivity most clearly diverged. Without wishing to be bound to particular theory, by inspecting the noise sensitivity of VGG-19 after training and testing on Gaussian pixel noise, it can be seen that noise sensitivity actually tends to decrease as information is passed on to higher layers of the network. This implies that after low-SSNR noising training (in combination with noise-free images), the processing of visual information across these successive stages of the network resembles a type of de-noising process.

Experiment Methodologies

The experimental data shown herein were acquired in a study conducted to rigorously evaluate the robustness of deep learning networks at recognizing objects in noisy viewing conditions. The study entails systematically varying the signal-to-combined-signal-and-noise ratio of object images and comparing the performance of deep neural networks with human performance. As noted above, it was observed (within this study) that deep learning networks can match and exceed the performance of human observers when tasked with recognizing objects in noise-free images and in extremely noisy images. The study evaluated the performance accuracy of human participants (N=20) and 8 pretrained CNN models at a 16-alternative forced-choice object classification task, in which objects were presented with visual noise across a wide range of signal-to-combined-signal-and-noise ratios.

As part of the study, the recognition performance of humans and CNNs was evaluated by presenting images of objects varying levels of visual noise. The study evaluated recognition accuracy for objects presented in two distinct types of visual noise: spatially uncorrelated Gaussian noise that was applied independently to every pixel and spatially correlated "Fourier phase-scrambled" noise. Pixelated Gaussian noise images were created by randomly drawing luminance values from a normal distribution, independently for every pixel in the image; the result is a spatial pattern of "white noise" that has an even distribution of power across all spatial frequencies in the Fourier domain. The study created Fourier phase-scrambled noise by calculating the Fourier transform of each source image, randomizing the phase values while preserving the Fourier amplitude component, followed by reconstruction of the phase-scrambled image through application of the inverse Fourier transform. Natural real-world images have greater power at lower spatial frequencies that typically approximates a $1/F^\alpha$ function in the Fourier domain, with $\alpha$ typically ranging from 1.0 to 3.0 for individual images, with an average value close to 2.0.

FIG. 10 shows examples of an object image embedded in spatially uncorrelated noise (e.g., Gaussian pixel noise) and spatially correlated noise (e.g., Fourier phase-scrambled noise) presented at various signal-to-combined-signal-and-noise ratios (SSNRs) as used in an evaluative study, in accordance with an illustrative embodiment.

FIG. 11 shows the sixteen object categories used to test recognition performance in the evaluative study, in accordance with an illustrative embodiment. The sixteen object categories were selected from ImageNet 2012, a visual database that consisted of 1.2 million training images organized according to 1000 different categories. For training of the neural network using low-SSNR images, 1300 images per category from ImageNet 2012 training data set was used and 50 images per category from ImageNet 2012 validation data set was used to test the trained neural networks. Additional description of ImageNet 2012 can be found, for example, in Russakovsky et al. "ImageNet Large Scale Visual Recognition Challenge," International Journal of Computer Vision (IJCV), 115:3, pp. 211-252 (2015), which is incorporated by reference herein in its entirety.

The conducted study evaluated 16 categories of objects out of the 1,000 categories and required human participants to make a 16-alternative forced-choice decision on every trial. The stimuli were drawn from 8 animate categories (bear, bison, cat, elephant, hamster, hare, lion, owl) and 8 inanimate categories (airliner, jeep, sports car, speedboat, schooner, couch, table lamp, teapot) as shown in FIG. 11. The categories were chosen to ensure that the various object images would share some visual and semantic features with other tested categories (e.g., jeep and sports car) and would also be readily nameable for all participants (unlike say, different breeds of dogs). Each category consisted of 50 different images from the validation data set; thus, a total of 800 images were used in this study. All images were converted to grayscale so as to minimize more obvious effects of color on object recognition performance and presented against a uniform gray background within a square window that subtended 16°×16° of visual angle.

Study: Low-SSNR Training and Testing Image Preparation

To generate the low-SSNR images for the study, the system used in the study reduced the effective dynamic range of the original noise-free image, and then combined the resulting range-reduced image with a randomly generated noise image. The signal-to-combined-signal-and-noise ratio (SSNR) of a given object image was defined as the ratio of the effective dynamic range of the range-adjusted source image relative to the effective dynamic range of the range-adjusted source image plus the range-adjusted noise image, as described by Equation 4. The study used 10 different levels of SSNR to evaluate human recognition performance (namely, 0.05, 0.1, 0.15, 0.2, 0.25, 0.3, 0.35, 0.4, 0.5, and 0.75). Each image (size 16×16° of visual angle) was presented briefly for 200 ms, in grayscale version, against a uniform gray background.

Study: Neural-Network Training Procedure

The study evaluated the performance of 8 different pre-trained CNN models provided with the MatConvNet toolbox including AlexNet, VGG-F, VGG-M, VGG-S, VGG-16, VGG-19, GoogLeNet, and ResNet. The study quantified the accuracy of CNN performance at each of 20 levels of SSNR, from 0.05, 0.10, 0.15, . . . to 1.0, for every test image in the ImageNet validation data set obtained from the 16 categories. The object classification response of the CNN was determined by obtaining the soft-max values for each the 16 categories of interest from the classification layer and selecting the response with the highest soft-max value as the chosen category.

The study initialized the weights in the convolutional layers with those of pretrained CNNs for 1000-way classification on ILSVRC 2012 dataset. The system trained the CNN (VGG-19, ResNet and AlexNet) on object images from each of the 16 categories obtained from the training data set of the ILSVR Challenge 2012. Notably, the system trained the CNN on object images at a specific SSNR level or on a mixture of noisy and noise-free images, using stochastic gradient descent with a mini-batch size of 24. A weight decay of 0.0005 and a momentum of 0.9 were used for training. The system trained the network with a fixed learning rate of 0.001 for 20 epochs. The system did not adopt batch normalization in our noise-training scheme. It is contemplated that considerable leeway is possible in terms of the choice of specific parameter values, learning rate, and choice of neural network architecture to be trained, to obtain the benefits of noise training with the system. All noise-image training was performed using the publicly available MatConvNet Toolbox in the MATLAB programming environment on an Intel 6-Core i7 workstation with NVIDIA TITAN-X Pascal card for GPU processing using the CUDA software library.

Figures 12A, 12B, 12C:
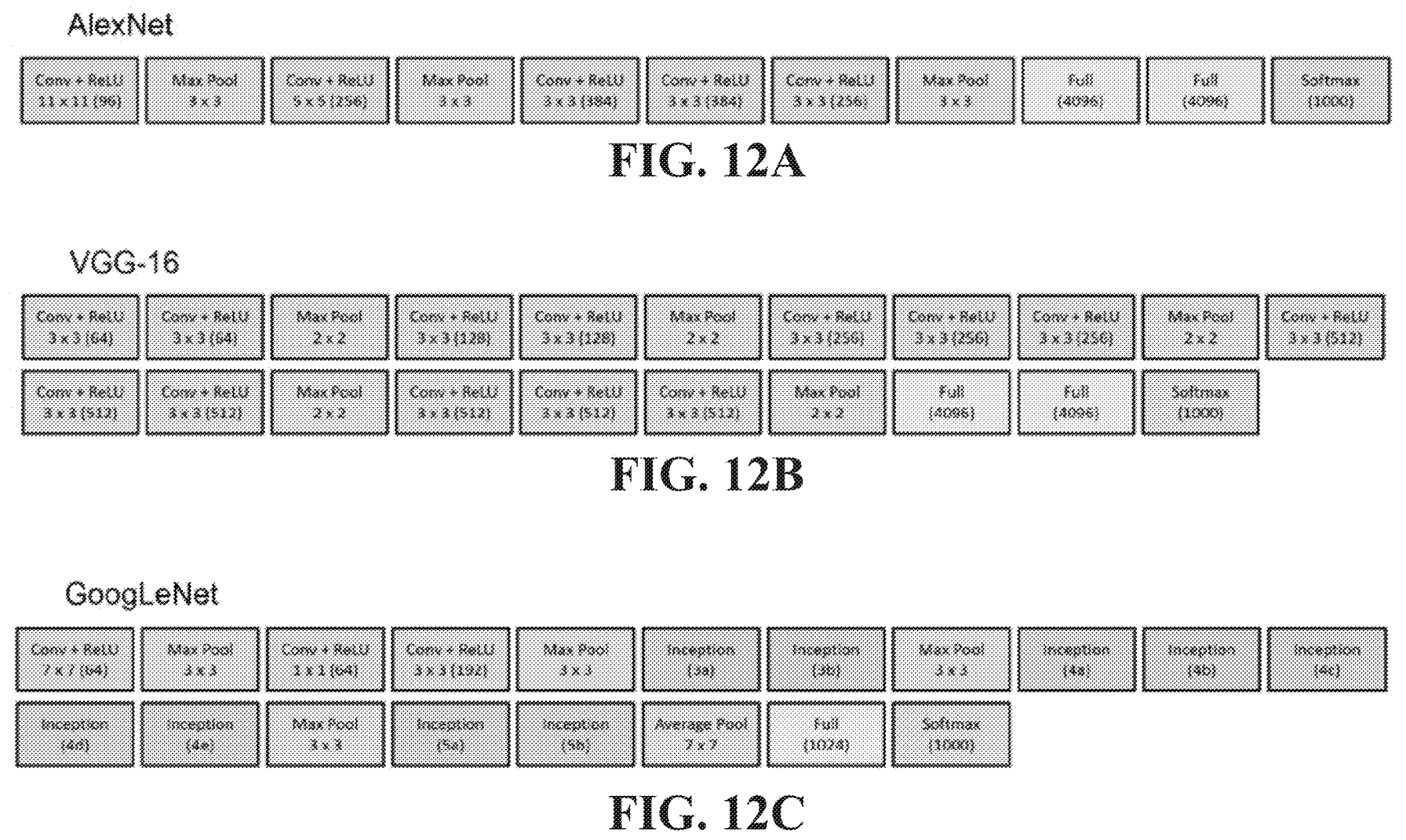
Figure 12E:
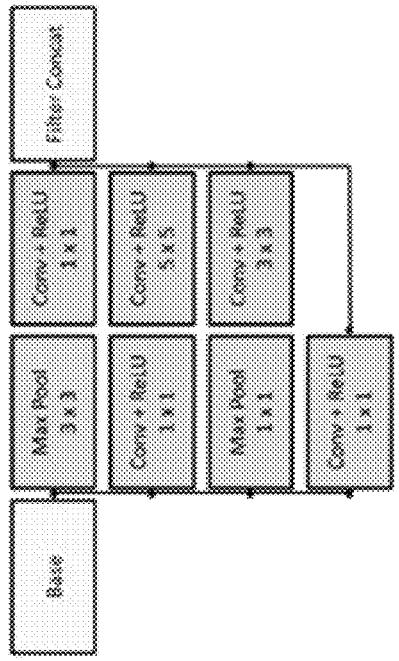
Figure 12D:

FIGS. 12A-E each shows diagrams of the general architecture of pretrained CNN models that were used in the study, in accordance with an illustrative embodiment. A subset of these CNN models was further trained with dual-SSNR-noise in the study. Any of the pre-trained CNN models, among others, can be dual-SSNR-trained according to the exemplary methodologies disclose herein. As shown in FIG. 12A, AlexNet, the top performer in the 2012 ILSVRC challenge, has 5 convolution layers and 3 fully connected layers. The model relies on rectified linear units for non-linearity instead of a sigmoid or hyperbolic tangent function, and its training was performed on multiple graphic processing units (GPUs). It also included local response normalization, in which a unit's response is divisively normalized relative to its neighbors to implement a form of lateral inhibition as has been observed in the visual cortex. After local normalization, max-pooling is applied so that units can acquire some degree of invariance in their response across small changes in the position of a preferred feature. In addition, the study trained AlexNet by applying a dropout technique to prevent overfitting in the first two fully-connected layers, in which each unit's response was set to zero with probability of 0.5. AlexNet is widely used as a standard architecture for CNN recognition tasks, and commonly serves as a performance benchmark in machine learning studies.

As shown in FIG. 12B, VGG-16 (and VGG-19) relies on a stack of smaller 3-by-3 convolution filters and 2-by-2 pooling operations throughout the network. Its structure suggests that the depth of the network is an important factor for achieving better object classification performance. The VGG architecture has gained popularity due to its simplicity and effectiveness.

In comparison, as shown in FIG. 12C, GoogLeNet includes a deeper layer CNN architecture that has reduced numbers of parameters needed to be learned and specified. An "inception" module is used that act as multi-scale feature extractors by varying sizes of convolution filters in parallel (see FIG. 12D). Additionally, GoogLeNet applied a bottleneck approach of using 1×1 convolution filters to avoid parameter explosion and overfitting (see FIG. 12E). The model also replaced the fully connected layers with a global average pooling layer, which significantly reduced the total number of parameters required.

Study: Human-Observer Testing

FIG. 13 shows a diagram of a study conducted with human participants to assess accuracy performance of a typical person in recognizing objects in visual noise at varying SSNR levels, in accordance with an illustrative embodiment.

Twenty participants (ages 19 to 33) were evaluated in the study. All participants had normal or corrected-to-normal visual acuity. Participants took part in two test sessions performed on different days and were tested with a different type of noise in each session. Half of the participants were assigned to perform the Gaussian noise session first while the other half were assigned to perform the Fourier phase-scrambled noise session first. Participants were provided with instructions about the nature of the stimuli to be seen and the recognition task, and then began performing the study with no practice trials provided.

In each experimental session, the participants were briefly shown each of 800 object images presented just once, in randomized order, at a randomly determined SSNR level. The participants were tasked to identify which of the 16 categories was shown on each trial (i.e., 16-alternative forced choice; 16-AFC) by pressing 1 of 16 possible key combinations. This involved pressing 1 for animate and 2 for inanimate, followed by any number from 1 through 8 to indicate the specific object category. The categories and associated key assignments remained visible on the computer monitor throughout the experiment. Object images were briefly presented for only 200 ms. The study used the presentation duration to ensure that participants had enough time to recognize the object with high accuracy while minimizing the opportunity to make eye movements to a different part of the image or to engage in more elaborated cognitive strategies. In order to minimize fatigue, participants were provided with a short rest period every 40 trials. The experiment was implemented using MATLAB and the Psychophysics Toolbox (http://psychtoolbox.org/).

Experimental Results of Validation Using Images with Real-World Weather Conditions A second validation study has been conducted and confirmed that the exemplary noise-training procedure, and resulting dual-SSNR noise-trained CNNs, confer an advantage to deep neural networks at recognizing objects in real-world situations of visual noise, e.g., as can result from rain, snow or other weather conditions. In the weather validation study, images of vehicle objects in poor weather conditions were used as it was determined that such images were more readily available through web-based searches than was the case for most other object categories. Such objects are also readily available in multiple categories in the ImageNet database for training. FIG. 14 shows exemplary real-world noisy images for each of the validation image categories (8 categories) used in the validation study, in accordance with an illustrative embodiment. Indeed, FIG. 14 shows the 8 different categories of vehicles in real-world noisy conditions caused by weather. The validation images were used to compare the performance of the pretrained CNN and the noise-trained CNN (VGG-19).

Because obtaining highly accurate recognition of images having poor visibility caused by weather remains a major challenge for computer vision applications (e.g., for self-driving car technology), validation of the exemplary methods and systems of such real-world scenario and test-conditions was of considerable interest and demonstrated the robustness of the exemplary methodologies and resulting trained neural network.

Indeed, the weather validation study used images of real-world objects obfuscated in part by real-world weather. The weather validation study employed systematic Internet search of images (from Google images) using search terms for vehicle categories and weather conditions to retrieve images for the validation. The weather validation study initially retrieved 12,674 images using a Python-based web-crawling toolbox, referred to as iCrawler, to automatically download images from Google using keyword search terms that included a single vehicle type and a single weather description per Table 1. The validation study also included augmented search that repeated the same sets of search terms but further included the keyword search term, such as "driving" to the beginning of the query (e.g., from "sports car rain" to "driving sports car rain"), to obtain additional examples of objects (e.g., vehicles) with poor weather visibility.

TABLE 1

| | Search terms |
|---|---|
| Object search terms | "jeep", "convertible", "mini-van", "motor scooter", "pick-up truck", "sports car", "station wagon", "trailer truck tractor trailer" |
| Weather search terms | "rain", "snow", "fog", "storm" and "dust storm" |

To this end, in the weather validation study, 80 combinations of keyword search sets (namely, 8 categories×5 weather conditions×2 for inclusion/exclusion of driving) were performed, and the maximum number of downloaded images for each of the search queries was limited to 200.

An independent observer, naïve to the purpose of the study, manually performed an initial sorting of the downloaded images. The sorting was based on whether a given image contained noisy weather elements that at least partially obscured the vehicle in the image. The majority of images were classified as noise-free. Images were excluded if the relevant category was missing, or if other object categories were prominent in the image. The sorting criteria led to an initial selection of 106 digitized images of vehicles in noisy weather conditions for using in the study.

A second set of observers was used to validate the initial sorting manually performed by the first observer. In this next phase, three independent observers were recruited to view the 106 images to confirm that they did indeed contain noisy weather elements that obscured a vehicle in the image. The 106 manually sorted images were presented intermixed with 106 noise-free images obtained from the same web-based search. Each image was presented in a randomized order on a computer monitor for unlimited free viewing, and each observer was asked to rate "how strong is the noise in this image", using rating scale: "0"—not at all, "1"—mild; "2"—moderate, "3"—strong, "4"—very strong. Among the 106 manually-sorted images, 102 images were unanimously rated by all three observers as noisy (i.e., having a rating of 1-4). A corresponding number of non-weather images of the same category were added to the set to provide a 204-image data set. The 204 image data set included 25 jeep weather and 25 non-weather jeep images; 11 weather and 11 non-weather sports car images; 9 weather and 9 non-weather pick-up truck images; 16 weather and 16 non-weather trailer truck images; 7 weather and 7 non-weather station wagon images; 18 weather and 18 non-weather convertible images; 7 weather and 7 non-weather minivan images; and 9 weather and 9 non-weather motor scooter images.

The final set of 204 images (i.e., 102 noisy vehicle images and 102 noise-free vehicle images) were then used to validate, and test the performance of, both the pretrained baseline CNN and the noise-trained CNN. The noisy and noise-free test images were presented as RGB color images and were scaled to a size of 224 by 224 pixels.

For the weather validation study, a dual-SSNR noise-trained CNNs (e.g., a dual-SSNR noise-trained VGG-19 convolutional neural network) was configured and evaluated against the 204-image data set along with the source pre-trained CNN (e.g., pre-trained VGG-19 CNN). For noise training, an initially pre-trained VGG-19 CNN received dual-SSNR training on all 1000 categories from ImageNet (i.e., all image categories; 1,281,167 images in total) with a combination of both noise-free images and noisy-images. In each training epoch, the noise-trained VGG-19 CNN was presented with three training images derived from each image in the dataset, including: a first training image generated from the dataset image with 0.2 SSNR Gaussian pixel noise, a second training image generated from the same image with 0.2 SSNR Fourier phase-scrambled noise, and the dataset image as a third training image, i.e., without modification (i.e., noise-free at 1.0 SSNR). The order of all training examples was fully randomized. In the training, the RGB components of each of the training images were preserved. For the modified training images (e.g., Gaussian pixel noise and Fourier phase-scrambled noise), the effective contrast of each color channel of the image was reduced to 20% from the initial dynamic range of the image. A randomly generated pattern of achromatic noise at 80% contrast was then generated and added to each channel of a source image from the database. A different noise pattern was randomly generated and applied to each source image to generate each set of noisy training images of that source image. To this end, the dual-SSNR noise-trained VGG-19 CNN received training with a full set of noisy and noise-free images on each epoch (3,843,501 images total) for a total of 10 epochs. The dual-SSNR training was performed using stochastic gradient descent with a constant learning rate of 0.001, a weight decay value of 0.0005 and a momentum of 0.9, with a mini-batch size of 64. Batch normalization was considered but not used. These parameters are only examples as other suitable parameter settings may be used.

In other embodiments, a modest level of color-specific noise may be applied to a specific channel. That is, in such alternative embodiments, different noise pattern are added to each of the channel in which the noise pattern is optimized for that specific color channel.

FIGS. 15A and 15B each shows the accuracy performance of the dual-SSNR-trained CNN at recognizing both noise-free (rated as having no weather elements) and noisy images (rated as having weather elements) as compared to a pre-trained version of the CNN (e.g., trained exclusively on noise-free images), in accordance with an illustrative embodiment.

In FIG. 15A, two sets of plots are shown: accuracy results of the top-1 accuracy data and accuracy results of the top-5 accuracy data. In the top-1 accuracy data, the CNN's classification was considered correct if its first prediction of the most likely object category corresponded with the correct object category. For the top-5 accuracy data, the CNN's classification was considered correct if its 5 top predictions of the most likely object category included the correct object category (out of 1000 possible categories). As shown in FIG. 15A, the pre-trained VGG-19 network and dual-SSNR noise-trained VGG-19 CNN performed similarly well, and with high accuracy at recognizing noise-free images of vehicles. Notably, the dual-SSNR noise-trained VGG-19 CNN was observed to perform statistically better at classifying noisy images as compared to pre-trained baseline CNN for the top-1 accuracy data ($\chi^2=10.29$ and p=0.0013) and for the top-5 accuracy data ($\chi^2=10.26$ and p=0.0014), based on a Chi-squared test.

FIG. 15B shows performance of the dual-SSNR-trained CNN at recognizing differing levels (i.e., binned levels) of noisy images as compared to the pre-trained version of the CNN, in accordance with an illustrative embodiment. The performance data are shown binned by the rated level of noise in the images based on ratings made by the 3 independent observers: "noise-free" images, "mild" noise images, "moderate" noise images, and "strong" noise images. Real-world noisy images presented a greater challenge to both networks, leading to declines in performance. Indeed, FIG. 15B shows that the dual-SSNR-trained CNN yields comparable performance to the pre-trained CNN of the same configuration at accurately recognizing noise-free images while outperforming the pre-trained CNN at accurately recognizing noisy images, particularly at moderate and strong noise levels (p<0.05 for all comparisons marked by a single asterisk, based on a Chi-squared test). This was true for both top-1 accuracy and top-5 accuracy.

Overall, in the validation study, the dual-SSNR noise-trained CNN correctly labeled (i.e., top-1 prediction) 32 of the 102 noisy weather validation images while the pretrained baseline CNN only correctly labeled 13 of the same. The dual-SSNR noise-trained CNN also correctly identified 20 images that were incorrectly identified by the pre-trained CNN, whereas the pre-trained CNN only correctly identified 1 image that was incorrectly labeled by the dual-SSNR noise-trained CNN. In addition to showing category types, FIG. 14 also shows 6 example images that were correctly identified by the dual-SSNR noise-trained CNN that were incorrectly labeled by the pre-trained baseline CNN. Two of the example images (i.e., station wagon and trailer truck) were incorrectly identified by both networks.

Indeed, the results indicated that the dual-SSNR noise-training methods for deep networks, which rely on computationally generated noise patterns that are combined with noise-free real-world images, can support successful generalization of object recognition to real-world cases of visual noise.

Discussion

Researchers have found that the injection of a modest amount of noise into the inputs of a neural network can be beneficial, allowing the network to improve in generalization performance. Indeed, adding a small amount of noise to the inputs of a neural network during learning can be considered as mathematically equivalent to Tikhonov regularization. However, the impact of adding an extreme amount of noise to visual images, rather than to the responses of the first layer of units in a network, is less well understood. There have been some reports suggesting that adding a modest amount of noise to visual images can be beneficial for training, but few if any studies have attempted to train CNNs on images presented in extremely high levels of noise that task the limits of human perception, as we have done here. We understand that no study to date has demonstrated that CNNs are capable of achieving robustness to visual noise in a manner that can match the abilities of human observers.

The exemplified systems and methods provide a highly effective procedure for training convolutional neural networks (and other deep learning networks and various neural networks) to acquire human-level robustness at recognizing objects in extremely noisy viewing conditions. The above-discussed study demonstrated that, following the dual-SSNR-noise or multi-SSNR-noise training protocol, CNN performance, can be improved to concurrently acquire robustness to both spatially uncorrelated Gaussian pixel noise and spatially correlated Fourier noise, such that the noise-robust CNN can perform at least as well as or better than human participants at recognizing objects in extremely noisy degraded viewing conditions. The ability to attain human-level robustness to both uncorrelated and spatially correlated noise could be of great benefit to future applications in computer vision and artificial intelligence. For example, snow resembles spatially uncorrelated noise, whereas fog leads to spatially correlated noise.

Similar to the term dual-SSNR, the term multi-SSNR-noise trained neural network (as well as multi-SSNR-noise trained CNN or multi-SSNR-noise trained DNN) refers to a neural network that has been trained with a set of images predominantly having a first SSNR (e.g., corresponding to noiseless or generally noiseless) and at least two or more sets of images each predominantly having a different SSNR value (e.g., different levels of low-SSNR; at a low-level of SSNR and at a mid-level of SSNR).

The exemplified systems and methods and resulting CNNs as well as other DNNs (having robustness to noisy viewing conditions) have widespread applications in computer vision and artificial intelligence, including self-driving car technology, visually guided robot technology, and unmanned drone technology (e.g., for visually guided flight and visual surveillance) as well as for analysis of any visual imagery data, for example, but not limited to, those acquired from outdoor cameras, satellites, and other sources. The exemplified systems and methods and resulting DNNs would be especially useful for applications that involve degraded viewing conditions (e.g., such as those involving poor visibility, for example, caused by snow, rain, or fog) or those subjected to sensor noise that results for example from low-cost sensors and/or optics or poor illumination conditions.

The exemplified systems and methods have been tested on two different deep learning networks (AlexNet and VGG-19) at a 16-object category recognition task and on a very deep learning network (ResNet-152). The methodology has also been generalized to performance on the full 1000-category data set used in the ImageNet competition using the VGG-19 network. The generality of the exemplified noise training procedures for enhancing the robustness of deep learning networks is further extended in some embodiments by training using object images of real-photos or video acquired under poor viewing conditions, such as snow, rain, and/or fog. Further, the generality of the exemplified noise training procedures, in some embodiments, is further extended with the inclusion of other types of visual noise introduced into the training images.

The ability to recognize objects in both spatially correlated noise and spatially uncorrelated noise may further help computer vision systems deal with degraded viewing conditions caused by extreme weather.

Recent work has documented that the object recognition performance of DNNs can be severely disrupted by adding non-random adversarial noise and by adding randomly generated pixelated noise to object images. And although some studies have reported modest benefits in recognition performance by training DNNs on certain types of noisy object images, no previous study has demonstrated the ability to attain human-level robustness to visual noise as discussed herein. Indeed, the exemplified systems and methods provide a computational procedure for training DNNs to acquire human-level robustness to both spatially structured and spatially uncorrelated noise concurrently, which can perform well under both conditions of extreme noise and noiseless (and generally noiseless) conditions.

Rodner et al., "Fine-grained recognition in the noisy wild: Sensitivity analysis of convolutional neural networks approaches", arXiv preprint arXiv:1610.06756 (2016) showed that DNNs performed much worse at recognizing objects when random noise is added to every pixel of each color channel. A modest degree of improvement was shown in Rodner in DNN performance after the network was trained with dropout applied between the input data and the first convolutional layer of the network. Conceptually, this is akin to adding some random noise to the images by setting certain pixel values to zero. However, Rodner confirmed that DNN improvement in performance with noisy images was accompanied by a cost in recognition performance for noiseless images and argued against the efficacy of training DNNs using this approach.

Ulicny et al., "Robustness of deep convolutional neural networks for image recognition", Intelligent Computing Systems: First International Symposium, ISICS 2016 (March 2016) discussed the evaluation of the performance of DNNs on simpler images of handwritten digits (MNIST data set) with neural networks trained on adversarially-generated noisy images or by applying dropout to the input to the DNN. DNN performance was compared with that of human observers. It was found that there was some benefit of training with noisy images along with the use of application of DNN dropout to the input images, but in all cases, human performance was much better than the performance of the resulting trained DNNs.

Dodge et al., "A study and comparison of human and deep learning recognition performance under visual distortions," arXiv preprint, arXiv:1705.02498 (2017) applied additive Gaussian noise to every pixel of their object images and evaluated the performance of DNNs at recognizing 10 different classes of dogs, taken from the ImageNet dataset. It was observed that there was a modest degree of improvement in the performance of DNNs following noise training, but again, it was also observed that human observers greatly outperformed the resulting DNNs at recognizing objects, especially when presented with high levels of visual noise.

Deep Learning Background

Deep learning has transformed the fields of computer vision and automated object recognition, and AI approaches to many other cognitive tasks. The architecture of convolutional neural networks (CNNs) for object recognition were originally inspired by the functional organization of the visual system and the properties of the primary visual cortex. These were described in Fukushima, K., "Neocognitron: A self-organizing neural network model for a mechanism of pattern recognition unaffected by shift in position", Biological Cybernetics 36, 193-202 (1980) and Hubel, D. H., and Wiesel, T. N., "Receptive fields, binocular interaction and functional architecture in the cat's visual cortex", Journal of Physiology 160, 106-154 (1962).

The first layer of a CNN typically consists of convolutional rectified linear units that respond in a manner akin to spatial filters. There are many types of tuned convolutional filters in this layer, allowing for different types of visual selectivity. This is typically followed by a layer of max-pooling units, whose response reflects that of the maximally responsive convolutional unit for a particular feature type in the layer below. This core architecture is inspired by the functional properties of simple cells and complex cells in the early visual cortex. The first layer of neural units directly samples from the pixel input, such that each unit "sees" or samples from a small window of the image, and the neighboring units sample from adjacent portions of the image. Each successive layer of the neural network samples from a local array of inputs from the layer below, such that units in the higher layers of the network receive input from a much larger spatial region of the original input image. Repeated iterations of convolution followed by pooling allow the network to code for higher order object properties in the higher layers of the network. In effect, units in the higher layers become both more selective for complex, higher order properties, as well as more invariant to local variations in the image, as long as that higher order property is preserved. This is sometimes described as the selectivity-invariance problem of object recognition.

In the highest layers of a CNN, the network may be designed with fully connected units between successive layers, such that information from units responsive to any part of the image could potentially contribute to the final object classification decision. To perform well at object classification, these deep networks must undergo extensive supervised training with large image datasets to learn the relevant features and visual properties that best predict specific object classes. Learning is instantiated by changes in the weighted connections between units, implemented via backpropagation and stochastic gradient descent, e.g., as described in LeCun, Y., Bengio, Y., and Hinton, G., "Deep learning", Nature 521, 436-444 (2015).

In 2012, Krizhevsky et al. developed a deep convolutional neural network (CNN) that outperformed all other computer vision algorithms by a considerable margin at the ImageNet Large Scale Visual Recognition Challenge (ILSVRC) as reported in Krizhevsky, A., Sutskever, I., and Hinton, G. E., "ImageNet classification with deep convolutional neural networks", In Advances in Neural Information Processing Systems. pp. 1-9 (2012). In subsequent years of ILSVRC, the CNN approach has demonstrated steady improvements in object classification performance with some researchers claiming that CNNs now match or even surpass the abilities of human observers. However, the images in the ImageNet database typically consist of clear photos taken under well-lit viewing conditions. In the everyday world, people must also perform well under conditions of poor visibility, as can result from rain, snow, fog or poor lighting conditions. Recent studies have shown that systematically designed "adversarial noise" can greatly impair the performance of CNNs and bias these networks to make very unusual errors that a person would never make. Similarly, there are a few recent reports indicating that the object recognition performance of CNNs becomes quite impaired by the addition of random visual noise. However, few if any studies have performed a rigorous comparison of the recognition abilities of humans and CNNs at recognizing objects in varying levels of visual noise. More important, it had remained unclear, until this work, as to whether CNNs/DNNs are capable of achieving the robustness of human vision under extremely noisy viewing conditions.

Exemplary Computing Device

Referring to FIG. 16, an example computing device 1600 upon which embodiments of the invention may be implemented is illustrated. For example, each of the system 100, databases 108, and database 114 described herein may each be implemented as a computing device, such as computing device 1600. It should be understood that the example computing device 1600 is only one example of a suitable computing environment upon which embodiments of the invention may be implemented. Optionally, the computing device 1600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1600 to provide the functionality of a number of servers that is not directly bound to the number of computers in the computing device 1600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1600 typically includes at least one processing unit 1620 and system memory 1630. Depending on the exact configuration and type of computing device, system memory 1630 may be volatile (such as random access memory (RAM)), non-volatile (such as read-only memory (ROM), flash memory, etc.), or some combination of the two. This most basic configuration is illustrated in FIG. 16 by dashed line 1610. The processing unit 1620 may be a standard programmable processor that performs arithmetic and logic operations necessary for operation of the computing device 1600. While only one processing unit 1620 is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application specific circuits (ASICs). Thus, while instructions may be discussed as executed by a processor, the instructions may be executed simultaneously, serially, or otherwise executed by one or multiple processors. The computing device 1600 may also include a bus or other communication mechanism for communicating information among various components of the computing device 1600.

Computing device 1600 may have additional features/functionality. For example, computing device 1600 may include additional storage such as removable storage 1640 and non-removable storage 1650 including, but not limited to, magnetic or optical disks or tapes. Computing device 1600 may also contain network connection(s) 1680 that allow the device to communicate with other devices such as over the communication pathways described herein. The network connection(s) 1680 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1600 may also have input device(s) 1670 such as keyboards, keypads, switches, dials, mice, track balls, touch screens, voice recognizers, card readers, paper tape readers, or other well-known input devices. Output device(s) 1660 such as printers, video monitors, liquid crystal displays (LCDs), touch screen displays, displays, speakers, etc. may also be included. The additional devices may be connected to the bus in order to facilitate communication of data among the components of the computing device 1600. All these devices are well known in the art and need not be discussed at length here.

The processing unit 1620 may be configured to execute program code encoded in tangible, computer-readable media. Tangible, computer-readable media refers to any media that is capable of providing data that causes the computing device 1600 (i.e., a machine) to operate in a particular fashion. Various computer-readable media may be utilized to provide instructions to the processing unit 1620 for execution. Example tangible, computer-readable media may include, but is not limited to, volatile media, non-volatile media, removable media and non-removable media implemented in any method or technology for storage of information such as computer readable instructions, data structures, program modules or other data. System memory 1630, removable storage 1640, and non-removable storage 1650 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1620 may execute program code stored in the system memory 1630. For example, the bus may carry data to the system memory 1630, from which the processing unit 1620 receives and executes instructions. The data received by the system memory 1630 may optionally be stored on the removable storage 1640 or the non-removable storage 1650 before or after execution by the processing unit 1620.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Use of the phrase "and/or" indicates that anyone or any combination of a list of options can be used. For example, "A, B, and/or C" means "A", or "B", or "C", or "A and B", or "A and C", or "B and C", or "A and B and C". As used in the specification, the singular forms "a," "an" and "the" include plural referents unless the context clearly dictates otherwise. Moreover, titles or subtitles may be used in this specification for the convenience of a reader, which shall have no influence on the scope of the disclosed technology. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, and at the end thereof, various publications are referenced. The disclosures of these publications in their entireties are hereby incorporated by reference into this application in order to more fully describe the state of the art to which the methods and systems pertain.

What is claimed is:

1. A method of training a neural network, the method comprising:
    obtaining, by one or more processors, a plurality of source training images from one or more databases of images; and
    generating, by the one or more processors, a set of one or more noisy training images, including a set of first noisy training images, wherein each of said set of first noisy training images is generated based on each of the plurality of source training images by:
        adjusting values of a set of pixels of a given source training image to reduce the effective dynamic range of the given source training image; and
        adjusting, to introduce noise, values of pixels of the range-adjusted source training image to generate a given first noisy training image of the set thereof;
    wherein the set of first noisy training images in combination with either a set of noiseless images or generally noiseless images or a set of second noisy training images are used as training images to train the neural network.

2. The method of claim 1, wherein ranges over which pixel intensity values in the noisy training images vary due to the introduced noise is as large as, or larger than, ranges over which pixel intensity values vary due to information originating from the source training images.

3. The method of claim 1, wherein variance of the pixel intensity values arising from the introduced noise exceeds variance of the pixel intensity values that arise from the source training images.

4. The method of claim 1, wherein the step of adjusting the pixel values of the range-adjusted source training image to generate the noisy training image includes:
    combining generated noise values arising from the introduced noise to values of a set of pixels of the range-adjusted source training image to generate a combined-noise image; and
    re-centering the range of the combined-noise image.

5. The method of claim 1 further comprising:
    generating, by the one or more processors, the second noisy training image of the set of one or more noisy training images,
    wherein the first noisy training image has a first associated SSNR (signal-to--combined-signal-and-noise ratio) value and the second noisy training image has a second associated SSNR value, wherein the first associated SSNR value and the second associated SSNR value are different, and wherein the first noisy training image and the second noisy training image are used in combination with noiseless images or generally noiseless images as training images to train the neural network.

6. The method of claim 1, wherein the introduced noise comprises a combination of both spatially uncorrelated noise and spatially correlated noise.

7. The method of claim 1, wherein the introduced noise is applied in a non-uniform manner.

8. The method of claim 1, wherein the introduced noise comprises spatially uncorrelated pixel noise.

9. The method of claim 1, wherein the introduced noise consists substantially of Gaussian pixel noise.

10. The method of claim 1, wherein the introduced noise comprises spatially correlated noise that follows or resembles a $1/F^\alpha$ power spectrum in the Fourier domain.

11. The method of claim 1, wherein the introduced noise comprises a plurality of image elements having a semi-opaque component and/or an opaque component.

12. The method of claim 1, wherein the introduced noise is introduced to a channel selected from the group consisting of:
a chrominance channel of the dynamic-range adjusted source training image, in which different noise images are introduced to the red, green, and blue channels, and
a luminance channel of the dynamic-range adjusted source training image, in which the same noise image is introduced to the red, green and blue channels.

13. The method of claim 1, further comprising:
converting, by the one or more processors, the plurality of source training images to greyscale, wherein the introduced noise is used to adjust scalar values of the plurality of converted greyscale source training images.

14. The method of claim 1, wherein the plurality of source training images, or a portion thereof, comprise one or more captured frames of a recorded video, including a first captured frame and a second captured frame, wherein the introduced noise of the first captured frame includes a component of spatiotemporal-correlated noise associated with the introduced noise of the second captured frame.

15. The method of claim 1, wherein the plurality of source training images, or a portion thereof, comprise one or more captured frames of a recorded video, including a first captured frame and a second captured frame, wherein the introduced noise of the first captured frame is spatially uncorrelated with the introduced noise of the second captured frame.

16. The method of claim 1, wherein a database of the one or more databases of images comprises a plurality of sets of images, wherein each set of the sets of images is associated with an image category.

17. The method of claim 1, wherein each noisy training image of the set of one or more noisy training images comprises an associated SSNR value, and wherein the associated SSNR values for a portion of the set of noisy training images are sampled from a range of SSNR values or from a set of discrete SSNR values.

18. The method of claim 1 further comprising:
applying, by the one or more processor, the set of generated one or more noisy images in combination with either a set of generally noiseless images or a second set of noisy training images as training images to the training of the neural network.

19. The method of claim 1, wherein the neural network is selected from the group consisting of an autoencoder, a probabilistic neural network, a time delay neural network, and a convolutional neural network, deep neural network, deep convolutional network, deconvolutional network, feed-forward based neural network, recurrent based neural network, general adversarial network, variational auto encoder, Kohonen network, Support Vector Machine, and Markov chain-based networks.

20. The method of claim 1, wherein the set of first noisy training images in combination with the set of noiseless images or generally noiseless images are used as training images to train the neural network.

21. The method of claim 1, wherein the set of first noisy training images in combination with the set of second noisy training images are used as training images to train the neural network.

22. The method of claim 1, further comprising:
storing the set of the noisy images to a database from which the images can be retrieved for eventual training and/or testing of the neural network.

23. The method of claim 1, wherein the trained neural network is used in a control application, a diagnostic application, or computer vision application.

24. The method of claim 1, wherein the trained neural network is used to generate and apply labels for image categories to a set of images.

25. The method of claim 1, wherein the trained neural network is used to categorize and localize multiple different types of objects contained in a set of images.

26. The method of claim 1, wherein the step of adjusting the values of the set of pixels includes adjustments to all pixels of the given source training image.

27. A system comprising:
one or more processors; and
a memory having instructions stored thereon, wherein execution of the instructions by the one or more processors causes the one or more processors to:
obtain a plurality of source training images from one or more databases of images; and
generate a set of one or more noisy training images, including a set of first noisy training images, wherein each of said set of first noisy training images is generated based on each of the plurality of source training images by:
adjusting values of a set of pixels of a given source training image to reduce the effective dynamic range of the given source training image; and
adjusting, to introduce noise, values of pixels of the range-adjusted source training image to generate a given first noisy training image of the set thereof;
wherein the set of first noisy training images in combination with either a set of noiseless images or generally noiseless images or a set of second noisy training images are used as training images to train the neural network.

28. A non-transitory computer readable medium having instructions stored thereon, wherein execution of the instructions by one or more processors causes the one or more processors to:
obtain a plurality of source training images from one or more databases of images; and
generate a set of one or more noisy training images, including a set of first noisy training images, wherein each of said set of first noisy training images is generated based on each of the plurality of source training images by:
adjusting values of a set of pixels of a given source training image to reduce the effective dynamic range of the given source training image; and adjusting, to introduce noise, values of pixels of the range-adjusted source training image to generate a given first noisy training image of the set thereof;

wherein the set of first noisy training images in combination with either a set of noiseless images or generally noiseless images or a set of second noisy training images are used as training images to train the neural network.

* * * * *